(12) United States Patent
Weinerman et al.

(10) Patent No.: US 6,427,500 B1
(45) Date of Patent: Aug. 6, 2002

(54) LATCH, LOCK AND HINGE SYSTEM FOR USE WITH CLOSURES SUCH AS TONNEAU COVERS

(75) Inventors: Lee S. Weinerman, Medina; Scott A. Arthurs, Brunswick, both of OH (US)

(73) Assignee: The Eastern Company, Cleveland, OH (US)

( * ) Notice: Subject to any disclaimer, the term of this patent is extended or adjusted under 35 U.S.C. 154(b) by 0 days.

(21) Appl. No.: 09/437,033

(22) Filed: Nov. 9, 1999

Related U.S. Application Data

(60) Provisional application No. 60/107,592, filed on Nov. 9, 1998, and provisional application No. 60/110,704, filed on Dec. 3, 1998.

(51) Int. Cl.⁷ .............................................. E05B 65/06
(52) U.S. Cl. ................................. 70/135; 292/DIG. 43; 292/196; 292/38; 296/10; 296/24.1; 296/37.6; 296/76; 296/100.1; 296/100.7
(58) Field of Search .................... 70/135, 134, 208; 292/34–36, 38, 196, 216, 225, DIG. 39, DIG. 43; 296/10, 24.1, 37.6, 76, 100.1, 100.01, 100.02, 100.06–100.08

(56) References Cited

U.S. PATENT DOCUMENTS

| | | |
|---|---|---|
| 134,617 A | 1/1873 | Thompson |
| 185,613 A | 12/1876 | Wolfinger ..................... 16/277 |
| 608,601 A | 8/1898 | Henneberg et al. |
| 803,509 A | 10/1905 | Ryan |
| 900,336 A | 10/1908 | Williams ..................... 16/319 |
| 907,493 A | 12/1908 | Gunther |
| 927,824 A | 7/1909 | Welch |
| 981,843 A | 1/1911 | Davis |
| 1,137,828 A | 5/1915 | Anderson |
| 1,374,732 A | 4/1921 | Hamilton |
| 1,627,584 A | 5/1927 | Tishken |
| 1,785,362 A | 12/1930 | Regan |
| 2,370,781 A | 3/1945 | Cullum ..................... 292/346 |
| 2,729,089 A | 1/1956 | Pelcin ......................... 70/151 |
| 2,735,706 A | 2/1956 | Pelcin ......................... 292/34 |
| 2,825,219 A | 3/1958 | Marzillier ..................... 70/146 |
| 2,989,340 A | 6/1961 | Penner ....................... 296/100 |

(List continued on next page.)

OTHER PUBLICATIONS

Eberhard Manufacturing Co., "Catalog 107," 1966, pp. 71, 72 Depicting the No. 560 Deadbolt Latch.
Bronson Co., Homer D., "Hinge By the Homer D. Bronson Company," 1971, p. 25, Right Column Entitled "Spring Hinges".
Guden Co., H. A., "Hardware for Industry," 1979, p. 9, Bottom Third of Page Entitled "Spring Hinges".
Hong Kong Enterprise, p. 771, Showing 2 Hinges with Staggered Leaves, Right Column At Top, Jun. 1994, Kin Kei Company.

*Primary Examiner*—Suzanne Dino Barrett
(74) *Attorney, Agent, or Firm*—David A. Burge

(57) ABSTRACT

A latch, lock and hinge system having components that are well suited for use with closures such as tonneau covers that close the upwardly opening rear cargo compartments of pickup trucks and the like, includes rotary latch assemblies that are mounted on hinges for releasably engaging latch strikers to provide cover mounting connections that permit the cover both to pivot between open and closed positions, and to be removed when desired. The hinges have pivotally connected arms that are biased to hold the hinge-carried latches adjacent the cover when the cover is removed. Also included are other rotary latch assemblies that are connected by flexible cables to a latch operator assembly having an elongate housing that defines near its opposite ends a pair of recesses wherein latch operators are nested that can be concurrently moved toward each other by the fingers of one hand to unlatch and pivot open the cover. The latch operator assembly is lockable to prevent the cover from being opened and/or removed.

80 Claims, 16 Drawing Sheets

U.S. PATENT DOCUMENTS

| | | | | |
|---|---|---|---|---|
| 3,102,583 | A | 9/1963 | Rowe et al. | 160/209 |
| 3,191,244 | A | 6/1965 | Burke | 20/92.4 |
| 3,251,619 | A | 5/1966 | Schlage | 292/341.18 |
| 3,333,878 | A | 8/1967 | Pelcin | 292/37 |
| 3,464,729 | A | 9/1969 | Chambers | 292/218 |
| 3,469,277 | A | 9/1969 | Henrichs et al. | 16/145 |
| 3,704,039 | A | 11/1972 | Dean | 296/137 |
| 3,785,698 | A | 1/1974 | Dean et al. | 296/137 |
| 3,923,334 | A | 12/1975 | Key | 296/10 |
| 3,953,061 | A | 4/1976 | Hanson et al. | 292/5 |
| 4,014,572 | A | 3/1977 | Binns | 292/108 |
| 4,113,293 | A | 9/1978 | Paquette | 292/341.18 |
| 4,124,247 | A | 11/1978 | Penner | 296/100 |
| 4,135,273 | A | 1/1979 | Holmes | 16/169 |
| 4,457,146 | A | 7/1984 | Weinerman | 70/100 |
| 4,470,277 | A | 9/1984 | Uyeda | 70/118 |
| 4,475,311 | A | 10/1984 | Gibson | 49/176 |
| 4,485,522 | A | 12/1984 | Chen | 16/54 |
| 4,495,672 | A | 1/1985 | Adams | 16/229 |
| 4,498,694 | A | 2/1985 | Warwick | 292/337 |
| 4,503,692 | A | 3/1985 | Grint | 70/418 |
| 4,505,504 | A | 3/1985 | Matzkin et al. | 292/337 |
| 4,507,010 | A | 3/1985 | Fujiya | 403/322 |
| 4,598,940 | A | 7/1986 | DeGroat | 292/108 |
| 4,624,491 | A | 11/1986 | Vincent | 292/201 |
| 4,629,243 | A | 12/1986 | Jensen | 296/100 |
| 4,639,021 | A | 1/1987 | Hope | 292/7 |
| 4,641,865 | A | 2/1987 | Pastua | 292/5 |
| 4,669,765 | A | 6/1987 | Ullman | 292/153 |
| 4,678,212 | A | 7/1987 | Rubio | 292/7 |
| 4,762,360 | A | 8/1988 | Huber | 296/100 |
| 4,773,126 | A | 9/1988 | Voss | 16/288 |
| 4,788,837 | A | 12/1988 | MacFarlane | 70/3 |
| 4,841,755 | A | 6/1989 | Weinerman et al. | 70/208 |
| 4,850,209 | A | 7/1989 | Weinerman et al. | 70/208 |
| D303,754 | S | 10/1989 | Weinerman et al. | D8/344 |
| 4,892,338 | A | 1/1990 | Weinerman et al. | 292/35 |
| 5,018,777 | A | 5/1991 | Swenson et al. | 296/100 |
| 5,121,951 | A | 6/1992 | Harbom et al. | 292/175 |
| 5,131,246 | A | 7/1992 | Bonzer | 70/260 |
| 5,139,291 | A | 8/1992 | Schultz | 292/42 |
| 5,150,934 | A | 9/1992 | Grody | 292/288 |
| 5,205,015 | A | 4/1993 | Huang | 16/50 |
| 5,228,739 | A | 7/1993 | Love | 296/100 |
| 5,257,841 | A | 11/1993 | Geringer et al. | 292/340 |
| 5,322,336 | A | 6/1994 | Isler | 296/100 |
| 5,445,326 | A | 8/1995 | Ferro et al. | 292/336 |
| 5,513,420 | A | 5/1996 | Kennedy | 16/289 |
| D371,502 | S | 7/1996 | Morris | D8/331 |
| 5,564,295 | A * | 10/1996 | Weinerman et al. | 70/208 |
| 5,595,076 | A | 1/1997 | Weinerman et al. | 70/208 |
| 5,600,868 | A | 2/1997 | Tourville et al. | 16/277 |
| 5,632,522 | A | 5/1997 | Gaitan et al. | 296/100 |
| D383,664 | S | 9/1997 | Bennett | D8/330 |
| 5,671,958 | A | 9/1997 | Szapucki et al. | 292/175 |
| 5,743,586 | A | 4/1998 | Nett | 296/100 |
| D396,397 | S | 7/1998 | Swan | D8/331 |
| 5,884,363 | A | 3/1999 | Tofts | 16/223 |
| 5,884,948 | A * | 3/1999 | Weinerman et al. | 292/216 |
| 5,909,921 | A | 6/1999 | Nesbeth | 296/100.1 |
| 5,957,525 | A | 9/1999 | Nelson | 296/165 |
| D415,406 | S | 10/1999 | Weinerman et al. | D8/331 |
| 5,992,908 | A | 11/1999 | Yared et al. | 292/196 |
| D419,422 | S | 1/2000 | Weinerman et al. | D8/328 |
| D421,893 | S | 3/2000 | Weinerman et al. | D8/344 |
| D424,908 | S | 5/2000 | Weinerman et al. | D8/328 |
| 6,059,327 | A | 5/2000 | Yoshikuwa | 292/216 |
| D427,881 | S | 7/2000 | Weinerman et al. | D8/331 |
| D428,323 | S | 7/2000 | Weinerman et al. | D8/328 |
| 6,273,491 | B1 | 8/2001 | Bath et al. | 296/100.01 |

* cited by examiner

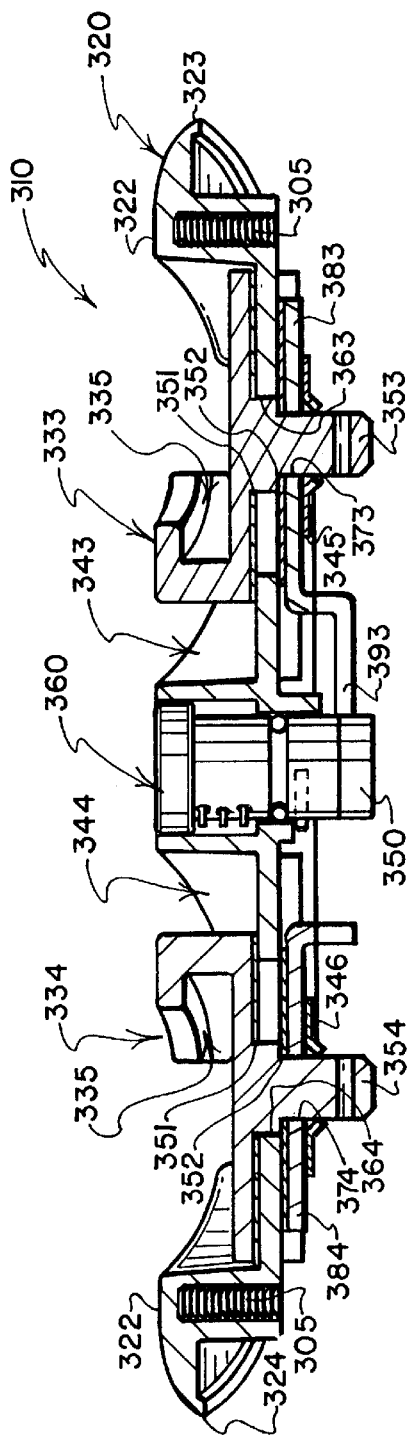
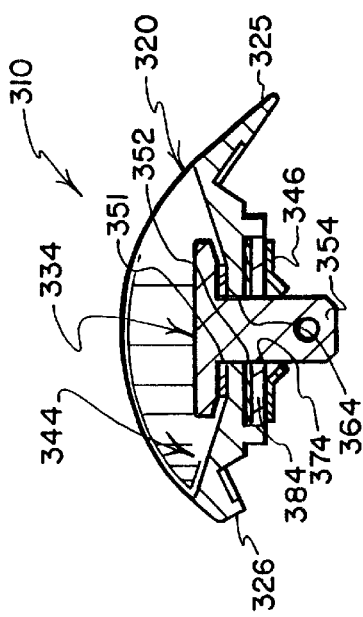
FIG. 13
FIG. 14

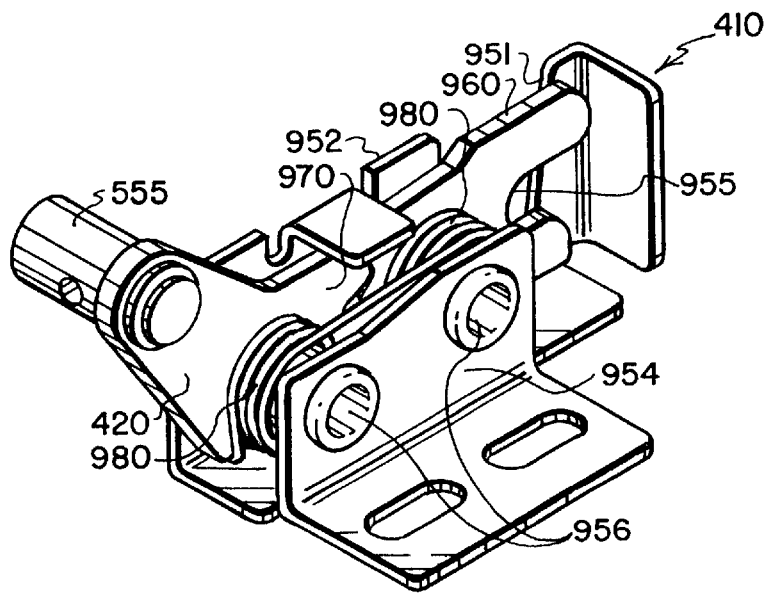
F I G. 21
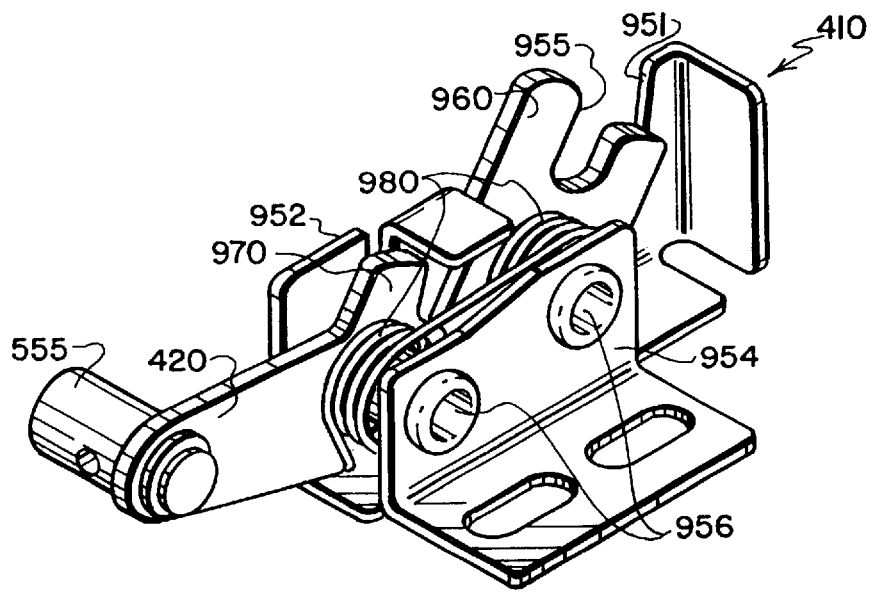
F I G. 22

LATCH, LOCK AND HINGE SYSTEM FOR USE WITH CLOSURES SUCH AS TONNEAU COVERS

REFERENCE TO PROVISIONAL APPLICATIONS

This application claims 1) the benefit of U.S. Provisional Application Serial No. 60/107,592 filed Nov. 9, 1998, and 2) the benefit of U.S. Provisional Application Serial No. 60/110,704 filed Dec. 3, 1998, both filed by Lee S. Weinerman and Scott A. Arthurs, and both being entitled LATCH, LOCK AND HINGE SYSTEM FOR USE WITH CLOSURES SUCH AS TONNEAU COVERS, the disclosures of which are incorporated herein by reference.

BACKGROUND OF THE INVENTION

1. Field of the Invention

The present invention relates generally to novel features of latch, lock and hinge components that are well suited for use with closures such as tonneau covers that cover and close the upwardly opening rear cargo compartments of pickup trucks and the like, it being understood, however, that these components and certain of their novel features also may be utilized individually and in various combinations with other types of closures and for other purposes.

2. Prior Art

It is known to provide the rear cargo compartments of vehicles such as pickup trucks with closures referred to as "tonneau covers" 1) that may be latched and locked closed to protectively enclose the contents of the tonneau covered cargo compartments, 2) that may be opened and re-closed in one way or another to provide at least limited access to contents therein and to accommodate loading and unloading, and 3) that may be entirely removed when desired for such purposes as enabling the vehicles to carry tall or bulky cargo that cannot be accommodated within the confines of the tonneau covered cargo compartments.

When a tonneau cover is to be installed on a pickup truck, two elongate steel side rails typically are positioned to extend forwardly-rearwardly along opposite sides of upper portions of the truck's cargo compartment, and are connected to body portions of the truck that underlie the side rails. Latch, lock and hinge components that are needed to removably attach the tonneau cover to the truck usually connect with these side rails—so that only the side rails themselves need to be physically attached to the body of the truck. Usually, a tonneau cover is connected by hinges to front end regions of the side rails, and latch assemblies carried by rear end regions of the tonneau cover are engageable with latch strikers carried by rear end regions of the side rails to hold the cover closed. So-called "gas props" (known more precisely to those skilled in the art as "gas springs") also may connect at their upper ends with opposite sides of the tonneau cover (at points located about mid-way along the length of the depicted tonneau cover), and at their lower ends with the side rails to cushion the pivotal opening and closing movements of the tonneau cover, and to hold the tonneau cover open.

To provide a pivotal connection between forward portions of a tonneau cover and forward end regions of a pair of side rails, various types of hinge components have been utilized. To permit the removal of a tonneau cover from a pickup truck on which it is installed, some of these hinges have been detachably coupled to the rails, or have been provided with disengageable components. The use of detachable hinges and hinges having disengageable components has drawn criticism, and the need for an improved means to provide removable tonneau covers with releasable hinged connections to underlying side rails has become apparent.

To secure a tonneau cover closed, commercially available latches have typically been mounted on the tonneau cover, usually at locations overlying the rear end regions of the side rails, and latch strikers have been connected to the rear end regions of the side rails. An ability to lock the tonneau closed has been provided if the selected latches include a locking capability. If two lockable latches are utilized (with each positioned to overlie the rear end region of a separate one of the side rails), each of these latches must be separately unlocked and operated before the tonneau cover can be opened—an arrangement that has proved cumbersome and has drawn criticism.

Thus it will be understood that the latch, lock and hinge components that have been used to date with tonneau covers have presented a number of drawbacks that typically have left tonneau covers more awkward, time-consuming and difficult to install, remove, open, close, latch, unlatch, lock and unlock than is desirable. In some instances the selected latch, lock and hinge components have provided shorter than desired service lives and/or a lesser than the desired degree of security by virtue of their being relatively simple to defeat, force, break or bypass. In some instances the latch, lock and hinge components have been too weak to withstand the forces that have been encountered during normal service use (e.g., damage or unintended release has been noted as the result of these components being impacted by cargo that shifts as a pickup truck travels from place to place), or these components have taken on such size and bulk as to project into regions of cargo compartments that should be reserved for cargo.

SUMMARY OF THE INVENTION

The present invention addresses the foregoing and other needs and drawbacks of the prior art by pro-providing a thoughtfully designed set of latch, lock and hinge hardware that is particularly well suited for use with tonneau covers and the like, characterized by novel features that also have other applications.

In accordance with one aspect of the preferred practice of the present invention, a dual-acting latch operating assembly is provided that can be installed at a central location between two latch assemblies for selectively operating one or both of the latch assemblies to release latch strikers that are latchingly engaged by the latch assemblies. The latch operating assembly preferably utilizes an elongate housing that defines elongate recesses near its opposite ends. Independently movable slides are nested in each of these recesses. The slides have rearwardly extending posts that extend through slots formed through the back walls of the recesses, and through elongate locking members that have end formations which extend behind central portions of the housing where a key-operated lock cylinder is installed if a locking capability is to be provided. The locking members move with the slides, and the permitted extent of this movement is limited at least in part by the length of the housing slots through which the posts of the slides extend. Retaining washers are installed on the posts to hold the slides and the locking members in place on opposite sides of the back walls of the recesses. Separate cables connect the rear end regions of each of the posts with a separate one of the latch assemblies for tripping (i.e., operating) each of the latch assemblies in response to movement of its associated slide from a normal "non-operated" position to an "operated" position.

In the preferred practice of the present invention, the locking members of the dual-acting latch operating assembly have end formations that move along opposite sides of a rear end region of the lock cylinder when the slides are moved from their normal "non-operated" positions to their "operated" positions to operate the associated latch mechanisms. Provided on the rear end region of the lock cylinder is a formation that can be oriented to align with the paths of movement of the locking members to provide no obstruction thereto, or that can be turned transversely to block these paths to "lock" the slides of the operating assembly against being moved to operate the associated latch assemblies. This simple arrangement of locking components provides a secure locking function that occupies very little space and that requires a minimum of components—a single lock at a central location situated between the two latch assemblies that requires a single use of a single key in order to unlock the tonneau cover.

Another feature of the preferred practice of the present invention resides in the option that is presented by the versatile design of the latch operating assembly to include or exclude (among the components of the latch operating assembly) springs for biasing the slides of the operating assembly away from their operated positions (i.e., toward their normal non-operated positions). If the latch assemblies that are associated with the latch operating assembly include springs that are capable of tensioning the cables that connect with the slides of the latch operating assembly to apply the needed biasing force to the slides, the latch operating assembly need not be provided with slide-biasing springs, whereby its cost and complexity can be held to a minimum. Alternatively, if the latch assemblies do not utilize springs that have quite the biasing power needed to properly tension the cables that connect with the slides of the latch operating assembly, auxiliary springs can be provided to apply added tensioning force to the cables to bias the slides toward their normal, non-operated positions.

For use with a tonneau cover having a curved or rounded rear end region, the housing of the operating mechanism preferably is curved and provided with upper and lower lip formations that complement the curvature of the rear end region of the tonneau cover. The configuration of the upper and lower lips may differ so as to give the upper and lower lip portions of the housing a non-symmetrical appearance, or may be substantially identical to provide a symmetrical appearance (see Patent D-415,406 issued Oct. 19, 1999, and pending application Ser. No. 29/105,433 filed May 25, 1999 wherein alternate latch operating assembly housing configurations are shown that may be employed in practicing the present invention, the disclosures of which are incorporated herein by reference). For mounting on surfaces having other configurations, the curvature and configuration of the housing lips and ends may be modified to provide a variety of acceptable appearances—including a shape that defines a relatively flat rear mounting surface (not shown) for mounting the latch operating assembly on flat surfaces.

In accordance with another aspect of the preferred practice of the present invention, a proven type of commercially available rotary latch assembly sold by Eberhard Manufacturing Company (a division of The Eastern Company, the assignee hereof) is utilized 1) to releasably latch the rear end region of a tonneau cover to latch strikers connected to the rear end regions of a pair of side rails (that underlie the tonneau cover in the usual manner), and 2) to releasably connect hinges that are carried by the front end region of the tonneau cover to latch strikers connected to the front end regions of the side rails. The rotary latch assemblies that preferably are employed with tonneau covers in accordance herewith preferably are of the type depicted in FIG. 18 of U.S. Pat. No. 5,564,295 (wherein a description also is provided of the operation of these rotary latch assemblies, with the disclosure of this patent also being incorporated herein by reference). While the operating components of these rotary latch assemblies are known and proven entities, the housings of these latches assemblies may be modified as needed to provide mounting surfaces that carry slotted holes or other mounting formations that can cooperate with mounting hardware such as threaded fasteners to mount the rotary latch assemblies on the cover in a manner that will allow for adjustment of the positioning of these latches—so the latches will function properly if the spacing between the parallel side rails varies a bit from one installation to another.

In accordance with another aspect of the preferred practice of the present invention, a novel type of latch-carrying hinge assembly is provided that utilizes pivotally connected arms that do not need to be disconnected from each other in order to remove a tonneau cover from a pickup truck, and that therefore do not need to be reconnected when the tonneau cover is to be reinstalled. A variety of hinge arm configurations that may be utilized in practicing the present invention are disclosed in pending application Ser. No. 29/097,281 filed Dec. 3, 1998 and in application Ser. Nos. 29/109,243 and 29/109,244 filed Aug. 12, 1999, the disclosures which are incorporated herein by reference.

In accordance with preferred practice, the type of disconnection that is utilized (to permit tonneau cover removal) takes place between the hinge-carried latch assemblies and latch strikers that are carried by the front end regions of the side rails that underlie the tonneau cover (i.e., no disconnection takes place between hinge arms or "halves"). The latch strikers each provide a rod-like formation that is captured by a separate one of the hinge-carried latch assemblies so as to fix one half of each of the hinges to the truck body, leaving the other halves of the hinges to pivot with the tonneau cover relative to the truck body as the tonneau cover is swung open and closed. One form of latch striker housing configuration that can be used in practicing this invention is disclosed in pending patent application Ser. No. 097,280 filed Dec. 3, 1998, the disclosure of which is incorporated herein by reference.

To install the tonneau cover, it is simply lowered into its proper position overlying the cargo compartment—a movement that brings the hinge-carried latch assemblies into latching engagement with the rail-carried latch strikers to securely connect the hinges to the truck bed. To remove the tonneau cover, the cover is pivoted open, and the hinge-carried latch assemblies are tripped by pulling short cables that are attached thereto (which can be accessed once one has pivoted the tonneau cover to an open position).

Still another aspect of the preferred practice of the present invention resides in the provision of protectively enclosed latch strikers that are secured to the front end regions of the side rails to cooperate with the hinge-carried latch assemblies. When these latch assemblies latchingly engage the latch strikers, the components of the latch assemblies are shielded by the latch strikers from being struck by moving cargo, and the release arms of the latch assemblies are shielded from being operated due to cargo impacts. Other features that may be utilized in the preferred practice of the invention include 1) the addition to the latch strikers of spring biased positioning devices that engage the housings of the hinge-carried latch assemblies when the latch assemblies are brought into latching engagement with the latch strikers, and/or 2) the addition to the latch strikers of sturdy compression coil springs for biasing the latch assemblies out of latching engagement with the latch strikers when the latch assemblies are tripped, so that the weight of the tonneau cover will not cause the latch assemblies to remain in latching engagement with the latch strikers when the latch assemblies are tripped during efforts to remove the tonneau cover from the pickup truck.

BRIEF DESCRIPTION OF THE DRAWINGS

These and other features, and a fuller understanding of the present invention may be had by referring to the following description and claims, taken in conjunction with the accompanying drawings, wherein:

FIG. 12 is a rear view thereof showing a resilient gasket overlying portions of the rear face of the housing of the latch operating assembly, and showing a locking cam carried by a key-operated lock cylinder rotated to its unlocked position;

FIGS. 13 and 14 are sectional views of the housing of the operating assembly as seen from planes indicated by the lines 13—13 and 14—14 in FIG. 9;

FIG. 21 is a perspective view of a rotary latch of the type that is depicted in FIG. 2 as being connected to the latch operating assembly, with the rotary bolt of the latch shown in its latched position, and with a release lever of the latch shown in its non-operated position;

FIG. 22 is a perspective view similar to FIG. 21 but with he rotary bolt of the latch shown in its unlatched position, and with the release lever of the latch shown in its operated position;

DESCRIPTION OF THE PREFERRED EMBODIMENT

Figure 1:
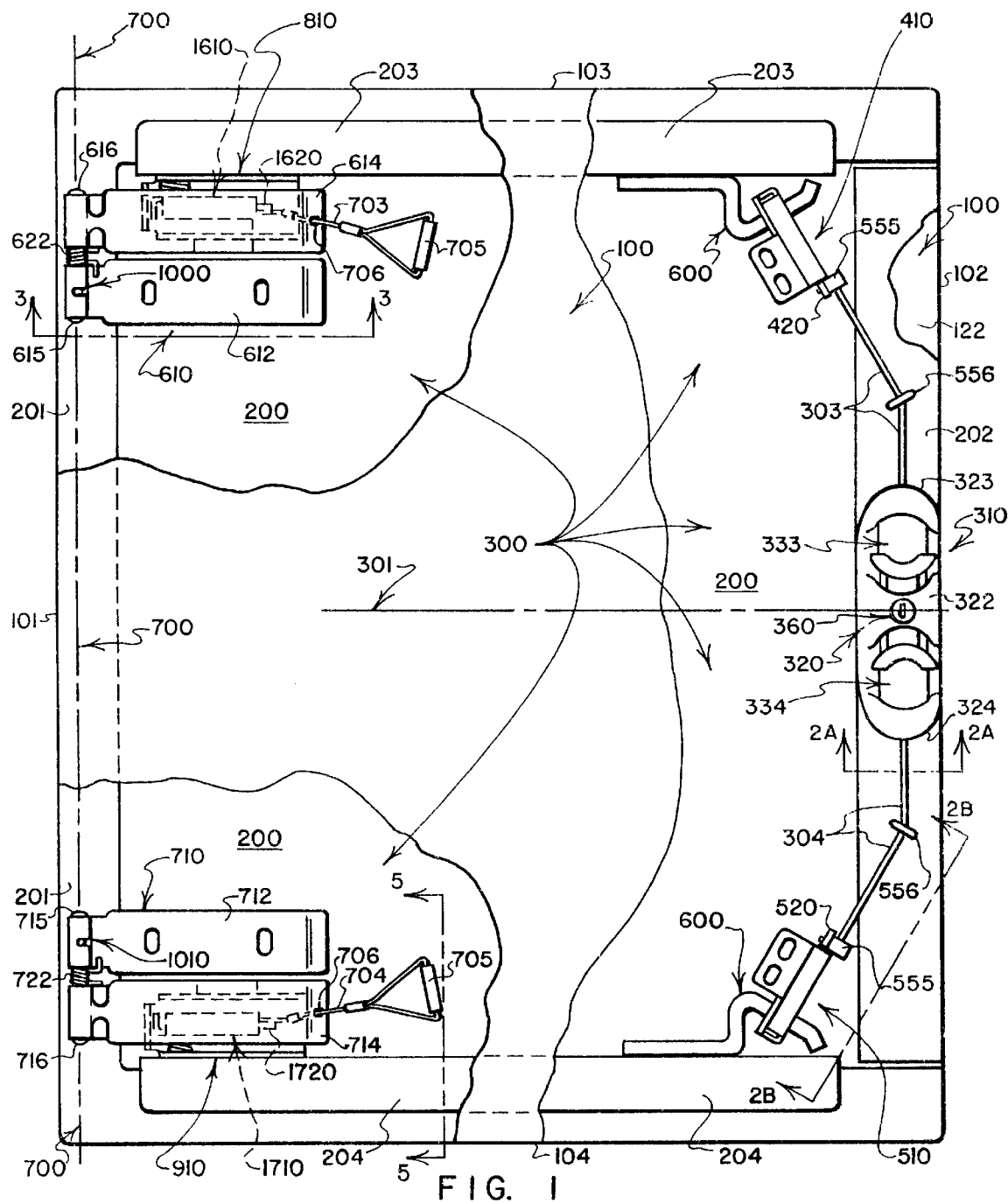
FIG. 1 is a top plan view of a tonneau cover overlying and closing a rear cargo compartment of a conventional pickup truck, with the tonneau cover and the body structure of the pickup truck that defines the cargo compartment being shown shorter in length and narrower in width than normal so that what principally is depicted are regions of the cover and body structure where components of the present invention are mounted, with a majority of the tonneau cover broken away so that components of the invention that underlie the cover and/or that are mounted on the body structure can be seen, including front and rear end regions of a pair of side rails that underlie the tonneau cover at locations on opposite sides of the cargo compartment.

Referring to FIG. 1, a tonneau cover 100 is provided for closing an upwardly opening cargo compartment 200 of a conventional pickup truck. While most of the tonneau cover 100 is broken away to permit underlying components to be viewed, it will be understood that the tonneau cover 100 normally covers the entire upwardly opening cargo compartment 200 so as to overlie the rectangular body structure of the truck that surrounds the cargo compartment 200. While the tonneau cover 100 and the cargo compartment 200 are depicted as being of relatively small size and of generally rectangular shape, it will be understood that tonneau covers and the cargo compartments they cover come in a variety of sizes and shapes, and that features of the invention can be utilized with a wide variety of tonneau covers as well as in other applications.

In the depiction of FIG. 1, the left side 101 of the cover 100 will be referred to as the cover's front, the right side 102 of the cover 100 will be referred to as the cover's rear, and the top and bottom sides 103, 104 of the cover 100 will be referred to as the cover's right and left sides, respectively. When the cover 100 overlies and closes the rear cargo compartment 200, as is depicted in FIG. 1: 1) the cover's front 101 typically extends alongside the rear wall of the truck's cab (not shown) and overlies a bed rail 201 of the truck that is located behind the truck's cab; 2) the cover's rear 102 overlies the truck's tailgate 202; 3) and the cover's right and left sides 103, 104 overlie right and left side rails 203, 204 that are installed on underlying portions of the body structure of the truck to extend along opposite sides of the cargo space 200.

Also depicted in FIG. 1 are novel components of a latch, lock and hinge system 300 used to releasably retain the tonneau cover 100 in position atop the truck's cargo compartment 200. Components of the system 300 that are associated with the cover's rear 102 include a latch operating assembly 310 that is connected by a right and left flexible cables 303, 304 to right and left rotary latch assemblies 410, 510 that engage identical latch strikers 600 that are connected to the rear end regions of the side rails 203, 204. Other components of the system 300 that are associated with the cover's front 101 include right and left latch-carrying hinge assemblies 610, 710 that overlie and engage right and left latch strikers 810, 910 that are connected to the front end regions of the right and left side rails 203, 204, respectively. The right hinge assembly 610 carries a right latch assembly 1610 that cooperates with the right striker unit 810. The left hinge assembly 710 carries a left latch assembly 1710 that cooperates with the left striker unit 910. Right and left flexible cables 703, 704 are provided with manually graspable handles 705 for operating the right and left latch assemblies 1610, 1710 to disengage the right and left latch strikers 810, 910 so the cover 100 can be removed from atop the cargo compartment 200 and stored at an out-of-the-way location when not needed.

To the extent that the system 300 includes components that are designated by the words "right" and "left," what generally is meant is that the "right" components are mirror images of the "left" components, and vice versa. For example, the right rotary latch assembly 410 is the mirror image of left rotary latch assembly 510, the right latch-carrying hinge assembly 610 is the mirror image of the left latch-carrying hinge assembly 710, and the right latch striker 810 is the mirror image of the left latch striker 910.

Several of the above-named components of the latch, lock and hinge system 300 perform more than one function. A function that is performed cooperatively by the rear components 310, 410, 510, 600 is to releasably latch and lock the cover's rear 102 closed. A function that is performed by the right and left latch-carrying hinge assemblies 610, 710 is to establish a pivot axis 700 (see FIG. 1) that underlies and substantially parallels the cover's front 101, about which the tonneau cover 100 pivots when it is opened and closed by raising the rear 102 of the cover 100. A function that is performed by the right and left latch assemblies 1610, 1710 and by the striker units 810, 910 is to releasably connect the hinge assemblies 610, 710 to the side rails 203, 204 to hold the cover's front 101 securely in place on the truck until such time as it is desired to remove the cover 100. A function that is performed cooperatively by all of the components of the system 300 is to retain the tonneau cover 100 in place so as to securely close the cargo compartment 200 when the cover 100 is lowered to and locked in its closed position, as depicted in FIG. 1. If it is desired to remove the tonneau cover 100 from the truck to provide unrestricted access to the cargo compartment 200, all four of the latch assemblies 410, 510, 1610, 1710 cooperate, when operated (by tensioning their associated cables 303, 304, 703 and 704 in directions extending away from the latch assemblies 410, 510, 1610, 1710, respectfully, to disengage the latch strikers 600, 810, 910—which permits the tonneau cover 100 to be lifted away from such body structure of the truck as surrounds the cargo compartment 200.

Figure 2:
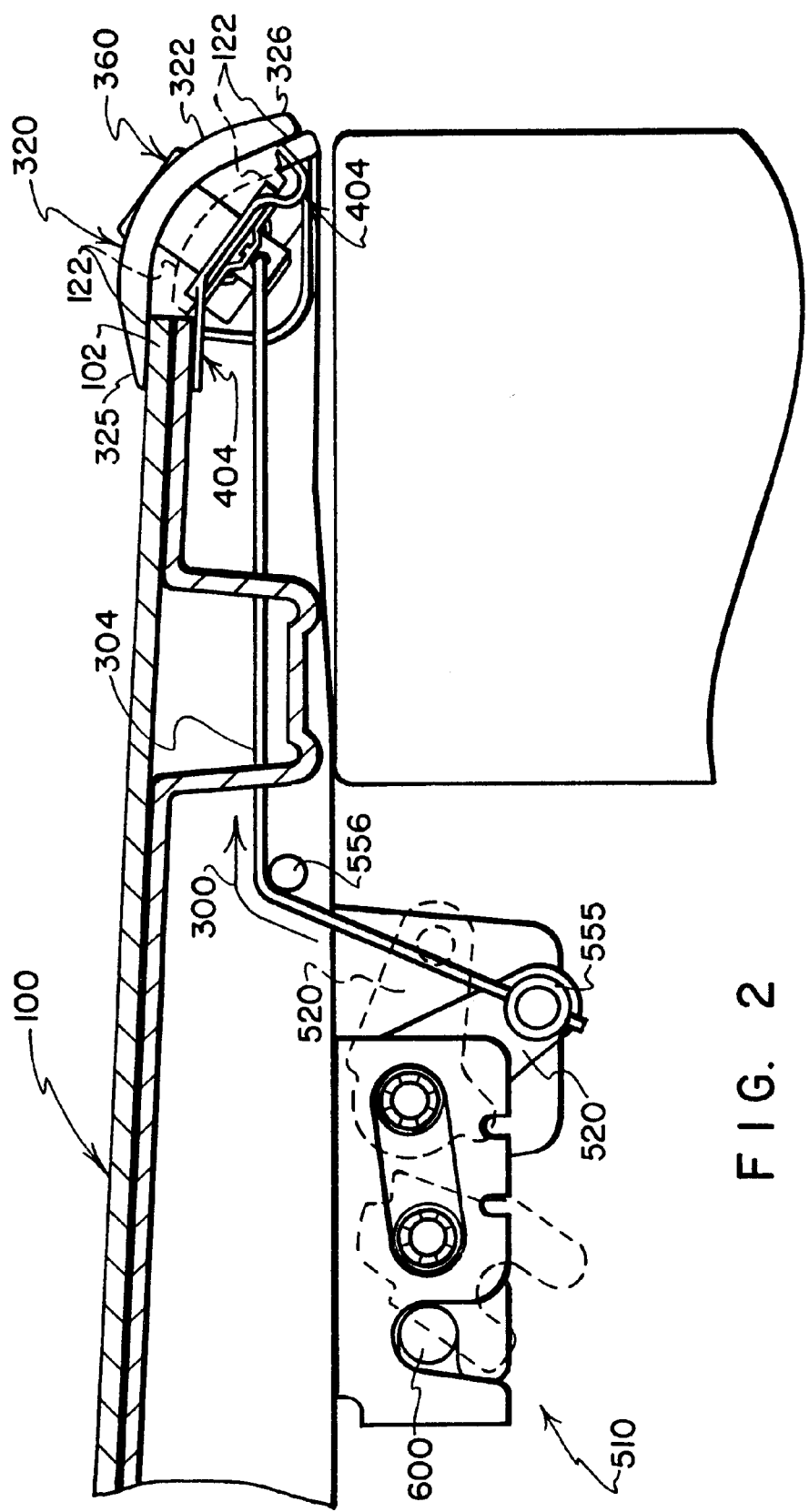
FIG. 2 is a somewhat schematic side elevational view showing, on an enlarged scale, selected portions of latch and lock components that are utilized to releasably retain the tonneau cover in its closed position, as seen mainly from planes indicated by lines 2A—2A and 2B—2B in FIG. 1.
Figure 10:
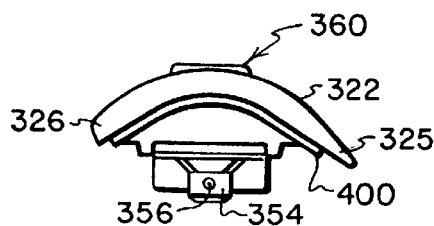
FIGS. 10 and 11 and 12 are right side and bottom views thereof.

Referring to FIGS. 1 and 7–9, the operating assembly 310 includes an elongate, one-piece housing 320 which has rounded right and left end regions 323, 324 and a rounded outer surface 322 that is configured to permit the housing 320 to substantially conform to and complement the shape of a curved portion 122 (see FIG. 2) of the cover's rear 102. Referring to FIGS. 2 and 7–10, the curved outer surface 322 extends smoothly from an upper lip 325 to a lower lip 326 of the housing 320, and extends along the length of the housing 320 between rounded right and left end regions 323, 324 thereof. As is best seen in FIGS. 2 and 10, the upper lip 325 is longer than the lower lip 326—an arrangement that gives the housing 320 an attractive non-symmetrical appearance. However, the housing 320 can take a variety of other configurations and still perform its purpose.

Figure 11:
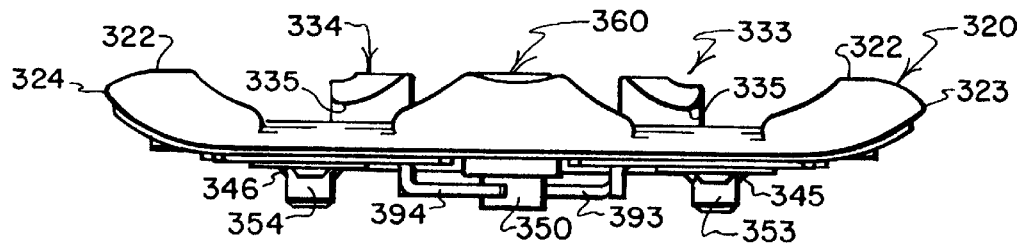

Referring to FIGS. 7–9 and 15, the operating assembly 310 includes right and left slide members 333, 334 that are movable rightwardly and leftwardly within the confines of right and left rounded-end recesses 343, 344 that are defined by the housing 320. The recesses 343, 344 open through the rounded outer surface 322. Referring to FIG. 11, the slide members 333, 334 have undercut regions 335 that assist one in gripping the slide members 333, 334 with the fingers of one hand to move the slide members 333, 334 toward each other to operate the rotary latch assemblies 410, 510 and to open the tonneau cover 100.

Figure 15:
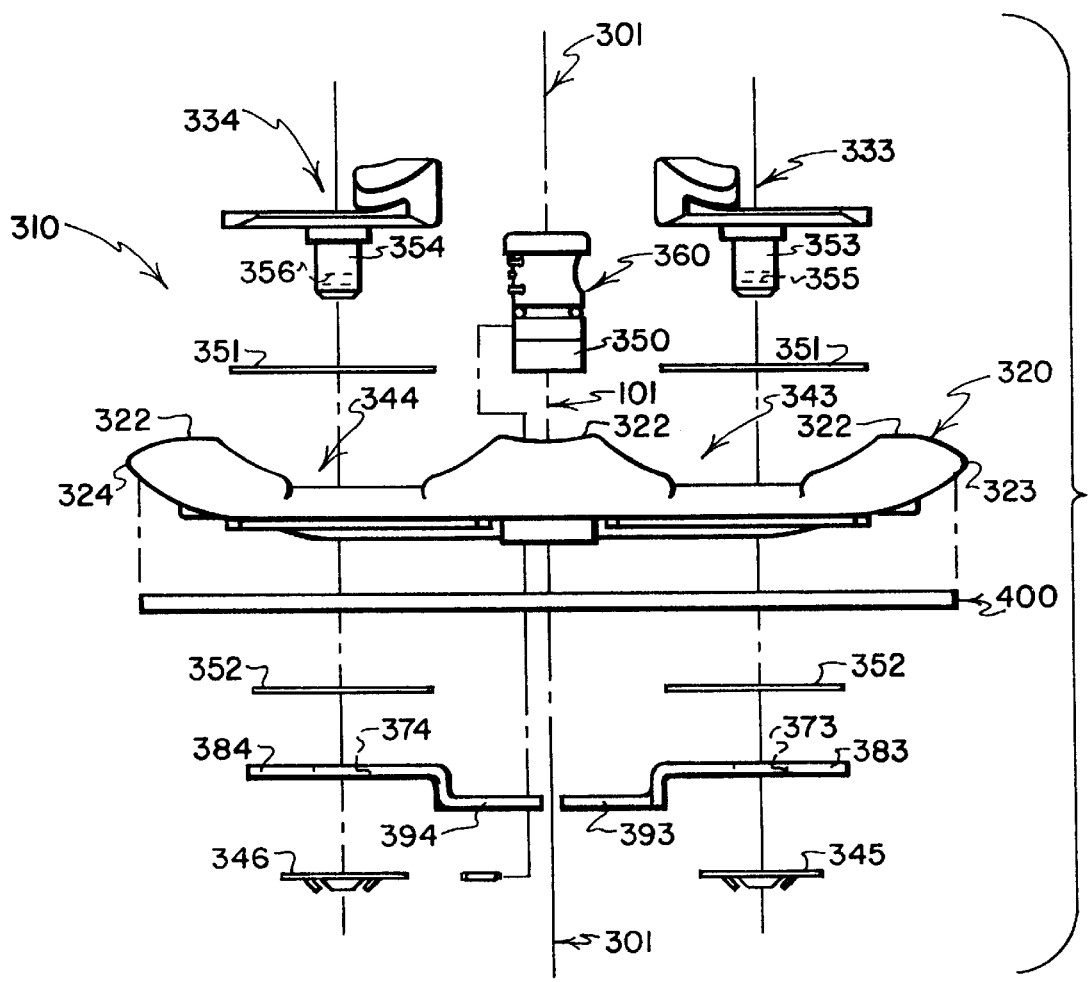
FIG. 15 is a bottom view, similar to FIG. 11 but with the components of the latch operating assembly shown exploded.

Referring to FIG. 15, an imaginary center plane of the latch operating assembly 310 is indicated generally by the numeral 301. The center plane 301 transversely intersects the length of the housing 320 (at a location half way along the length of the housing 320). As can be seen in FIG. 15, all of the components and features of the operating assembly 310 that are located to the left of the center plane 301 are matched by identically configured components and identical features that are located to the right of the center plane 301, except that the left components and features are mirror image reversals of the right components and features, and vice versa. Stated in another way, the latch operating assembly 310 is, in all respects, "left and right symmetrical" about the center plane 301. Moreover, this left and right symmetry about the center plane 301 holds true, in principle, for the other components and features of the latch, lock and hinge system 100.

Figure 12:
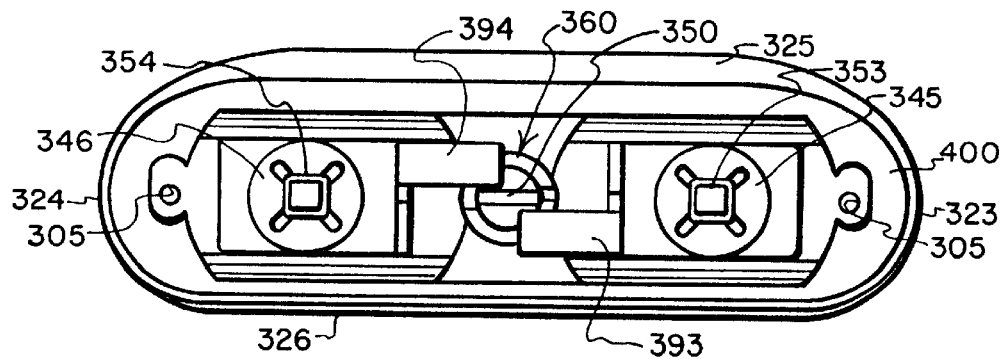

Referring to FIGS. 13 and 14, the slide members 333, 334 have rearwardly extending posts 353, 354 that extend through slot-like openings 363, 364 that are defined at the rear of the recesses 343, 344. The posts 353, 354 are of square cross-section and also extend through square holes 373, 374 (see FIG. 15) that are defined by right and left locking members 383, 384. Referring to FIG. 12, spring retaining washers 345, 346 are installed on the posts 353, 354 for retaining the slide members 333, 334 and the locking members 383, 384 in place so that the locking members 383, 384 are slidably movable along the rear side of housing 320 in concert with movements of the slide members 333, 334 along the front. side of the housing 320.

Referring to FIG. 15, holes 355, 356 are formed through the posts 353, 354, respectively, for receiving end regions of the right and left flexible cables 303, 304—which permits suitable connections to be formed between the right cable 303 and the right post 353, and between the left cable 304 and the left post 354. Although a certain amount of tension force may be imposed on the flexible cables 303, 304 by springs of the latch assemblies 410, 510 that bias the release levers 420, 520 of the latch assemblies 410, 510 toward their non-operated positions, and while this amount of tension force may be adequate to bias the slide members 333, 334 away from each other (i.e., toward their non-operated positions), it may be desirable to augment the biasing force that is imposed on the slide members 333, 334 to bias them toward their non-operated positions.

Figure 16:
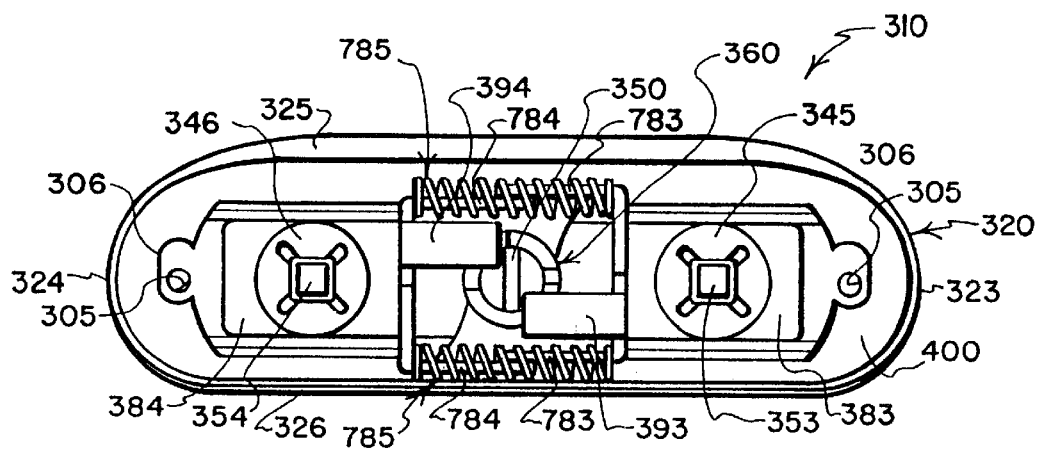
FIG. 16 is a rear view of the latch operating assembly but with springs added to bias the slides toward their non-operated positions, and with the locking cam carried by the key-operated lock cylinder rotated to its locked position.
Figure 17:
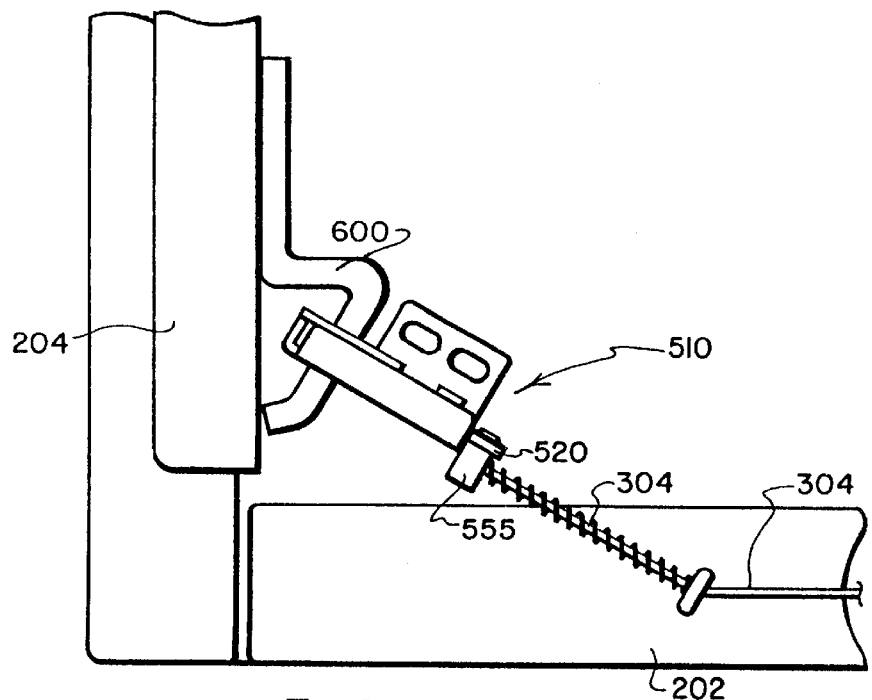
FIG. 17 is a top plan view showing one of the latch assemblies depicted in FIG. 1 with a spring added to tension a cable that connects the latch assembly to the latch operating assembly.
Figure 18:
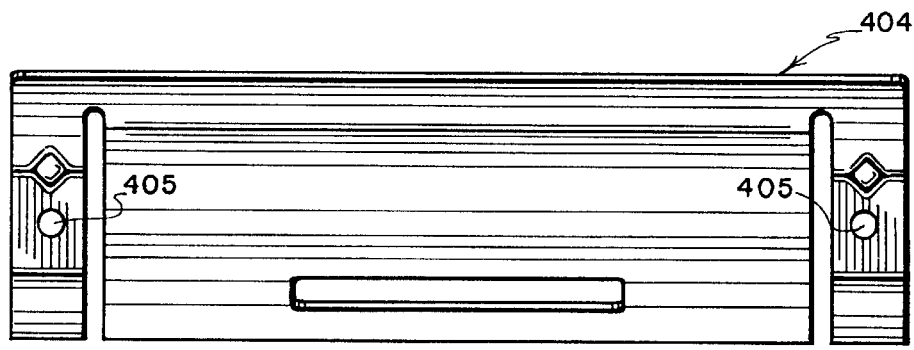
FIG. 18 is a front view of a mounting bracket that is used in mounting the latch operating assembly on a closure.
Figure 19:
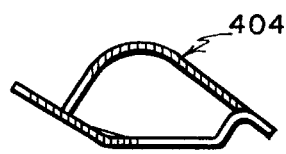
FIGS. 19 and 20 are end and side elevational views thereof.
Figure 20:
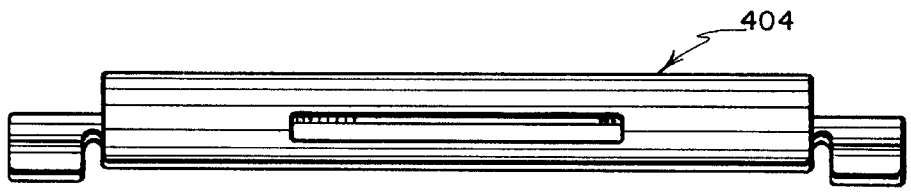
Figure 23:
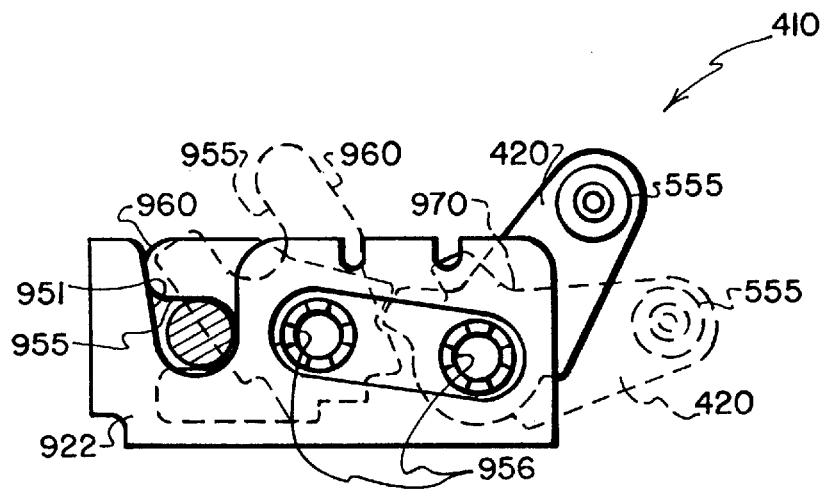
FIG. 23 is a side elevational view showing the opposite side of the latch depicted in FIG. 22, with solid lines depicting the latched position of the rotary bolt and the non-operated position of the release lever, and with dotted lines depicting the unlatched position of the rotary bolt and the operated position of the release lever.

Referring to FIG. 16, one way in which this biasing force can be augmented is to provide compression coil springs 785 that encircle side-by-side extending formations 783, 784 of the locking members 383, 384, with opposite end regions of the springs 785 pushing the locking members 383, 384 away from each other. Referring to FIG. 17, if it is not desired to provide the operating assembly 310 with springs to bias the locking members 383, 384 and the slide members 333, 334 toward their non-operated positions (or if it is desired to further augment the action of such springs), the cable 304 (and in a like manner the cable 303) can be provided with a compression coil spring that surrounds and end region of the cable 304 and presses against a cable guide 556 to bias a connector 555 (that couples the cable 303 to the release arm 520) away from the cable guide 556—by which arrangement the release arm is supplementally biased toward its non-operated position, and the added tension in the cable 304 biases the locking member 384 and the slide member 334 toward non-operated positions.

Figure 24:
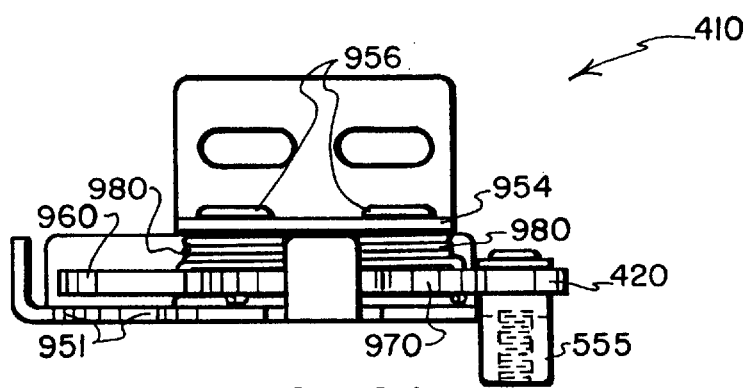
FIGS. 24 and 25 are are top and right end views thereof.
Figure 25:
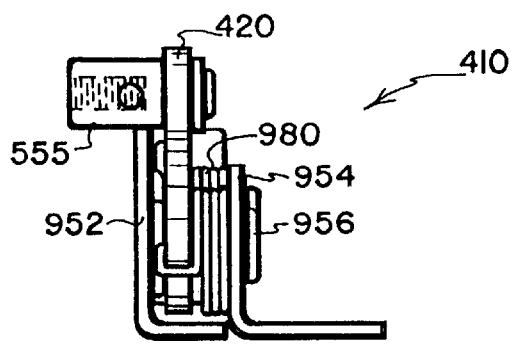
Figure 26:
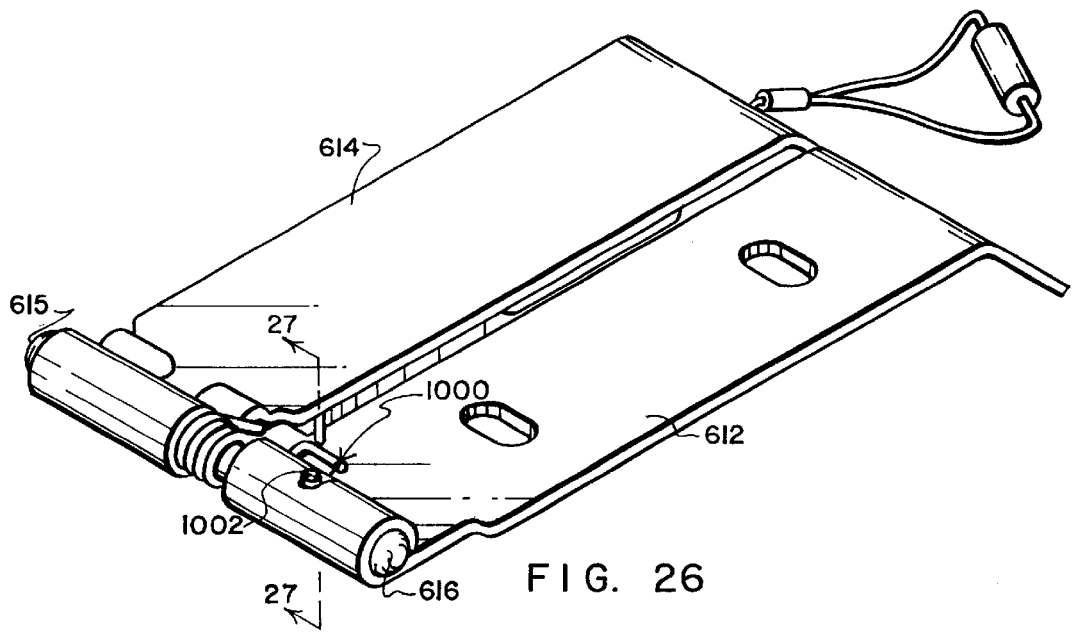
FIG. 26 is a perspective view of upper portions of the right latch-carrying hinge assembly employed in the latch system depicted in FIG. 1.
Figure 27:
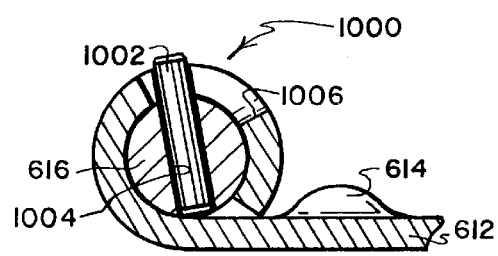
FIG. 27 is a sectional view, on an enlarged scale, as seen from a plane indicated by a line 27—27 in FIG. 26 showing portions of a pivotal connection that is provided between the arms of the hinge.
Figure 28:
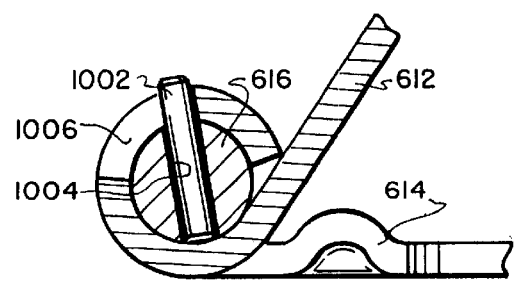
FIG. 28 is a sectional view similar to FIG. 27 showing the arms of the hinge pivoted relative to each other.

Referring to FIGS. 21 and 22, the connectors 555 preferably take the form of cylindrical members that have cable-receiving holes 557. Referring to FIGS. 24 and 25, the cable-receiving holes 557 are intersected by threaded passages 558 that preferably carry set screws (not shown) that can be clamped into seated engagement with end regions of the cables 303, 304 to establish connections between the cables 303, 304 and the latch release levers 420, 520.

Referring to FIG. 15, thin shims 351 of a suitable, relatively slick gasketing material such as vinyl film can be installed on the posts 353, 354 at locations on opposite sides of the housing 320 adjacent the slot-like openings 363, 364 to assist in providing smooth movements of the slide members 333, 334, and to resist passage through the slot-like openings 363, 364 of moisture.

Referring to FIGS. 12 and 15, the locking members 383, 384 have centrally located end formations 393, 394 that cooperate with a generally rectangular shaped rearwardly extending end formation 350 of a key-operated lock cylinder 360 that is mounted in a centrally located hole 370 defined by the housing 320, and retained in place by means of a suitably configured spring clip 371. Referring to FIG. 12, if the rectangular shaped formation 350 is aligned with the end formations 393, 394 (i.e., extends such that its long dimension aligns with the length of the housing 320), the end formations 393, 394 are free to move along opposite sides of the rectangular formation 350—hence the right and left slide members 333, 334 are "unlocked" inasmuch as they are free to move left and right within the recesses 343, 344. However, if the rectangular shaped formation 350 is turned ninety degrees to extend transversely relative to the length of the housing 320 (as is depicted in FIG. 16), the formation 350 will block left and right movements of the end formations 393, 394, hence the right and left slide members 333, 334 are "locked" inasmuch as they are prevented from moving right and left within the recesses 343, 344.

When "locked," the right slide member 333 is held in the right end region of the right recess 343, and the left slide member 334 is held in the left end region of the left recess. Thus, when the key-operated cylinder 360 positions the rectangular rear formation 350 to extend transversely, the operating assembly 310 is locked and cannot be utilized to unlatch the right and left rotary latches 410, 420; and, when the key-operated cylinder 360 positions the rectangular rear formation 350 to extend parallel to the length of the housing 320, the operating assembly 310 is "unlocked" and can have its right slide member 333 slided to the left to move the right cable 303 leftwardly to thereby trip (and hence unlatch) the right rotary latch 410, and can have its left slide-member 334 slided to the right to move the left cable 304 rightwardly to thereby trip (and hence unlatch) the left rotary latch 510. Referring to FIG. 2 wherein the left cable 304 and the left rotary latch 510 are shown, it will be seen that pulling the left cable 304 rightwardly in the direction of arrow 300 will cause an operating arm 520 of the left rotary latch 510 to be moved from a normal latching position shown in solid lines to an operated position depicted by hidden lines. Referring to FIG. 1, the other latch assemblies 410, 1610, 1710 have release levers 420, 1620, 1720, respectively, that pivot and function in the same manner as the release lever 520.

Referring to FIGS. 10, 12 and 15, a resilient gasket 400 preferably is provided for being sandwiched between perimetrically extending lip portions 325, 326 of the housing 320 and between portions of the rear 102 of the tonneau cover 100 that reside beneath these perimetrically extending lip portions. Referring to FIGS. 2 and 18–20, a mounting bracket 404 is provided to cooperate with the perimetrically extending lip portions 325, 326 in engaging opposite sides of the tonneau cover 100 as the operating assembly 310 is being installed on the tonneau cover 100. Suitable fasteners such as screws (not shown) are inserted through holes 405 located at opposite ends of the mounting bracket 404 and are threaded into aligned holes 305 (see FIG. 13) in opposite end regions of the housing 320 to clamp the mounting bracket 404 against the back side of the tonneau cover 100 as a concavely curved, rearwardly facing mounting surface (covered by the gasket 400) is clamped into firmly seated engagement with the convexly curved front side of the tonneau cover 100.

Referring to FIG. 12, the holes 305 are formed in lugs 306 that extend rearwardly in a manner that is not centered about the holes 305. The off-center configuration of the lugs 306 is preferred if there is a need to install the operating mechanism 310 "right side up" and to avoid "upside down"

installations—for the off-center lug formations 306 can be mated with off-center formations of the tonneau cover opening into which rear portions of the housing 320 extend to ensure that "upside down" installation is prevented. If there is no concern about "upside down" installation of the operating assembly 310, the lugs 306 can be formed so as to center about the holes 305.

The rotary latch assemblies 410, 510, 1610 and 1710 have housing and operating components that are formed and function in substantially the same manner—a manner that is well understood by those who are skilled in the art inasmuch as it is described in U.S. Pat. Nos. 5,564,295 and 5,884,948, referred to hereinafter as the referenced Rotary Latch Patents, the disclosures of which are incorporated herein by reference. Therefore, a detailed description of the rotary latch assemblies 410, 510, 1610, 1710 is not needed here.

Inasmuch as the rotary latch assemblies 410, 510 are identical (except that each is constructed so as to present a mirror image reversal of the arrangement of components offered by the other), and inasmuch as the rotary latch assemblies 1610, 1710 are identical (except that each is constructed so as to present a mirror image reversal of the arrangement of components offered by the other), only the rotary latch assemblies 410 and 1610 will be briefly described in the paragraphs that follow. Insofar as features of the latch assembly 410 is concerned, reference is made to FIGS. 21–25. Insofar as features of the latch assembly 1610 is concerned, reference is made to FIGS. 29–31.

Figure 29:
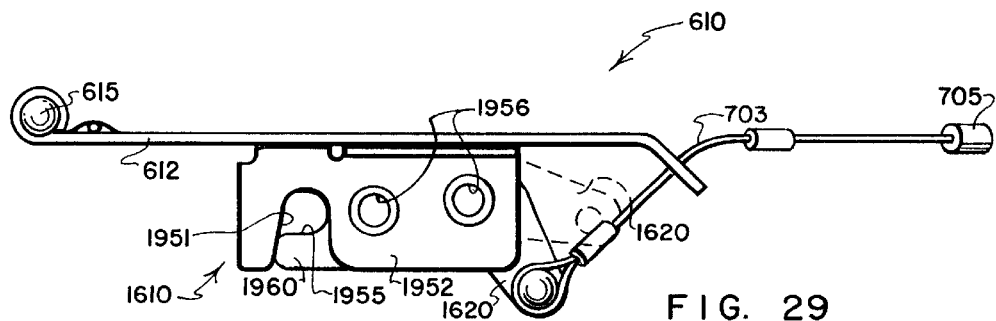
FIGS. 29, 30 and 31 are side, top and left end views of the right latch-carrying hinge assembly.
Figure 30:
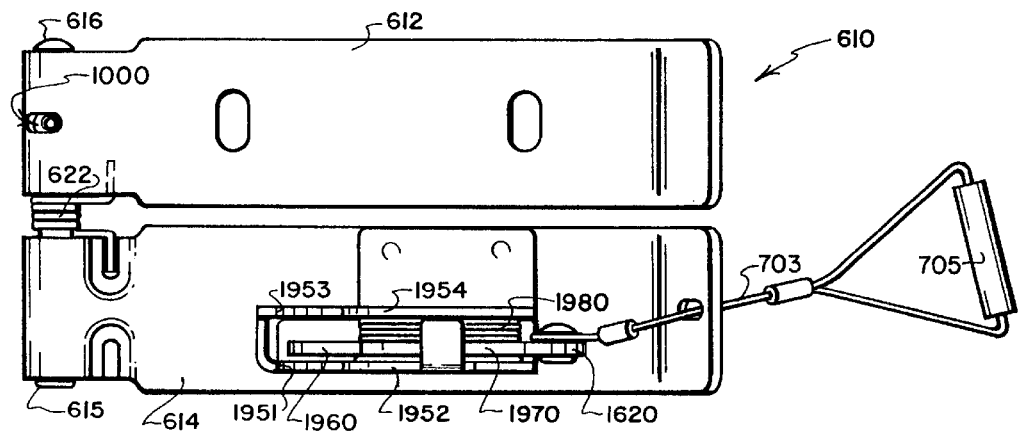
Figure 31:
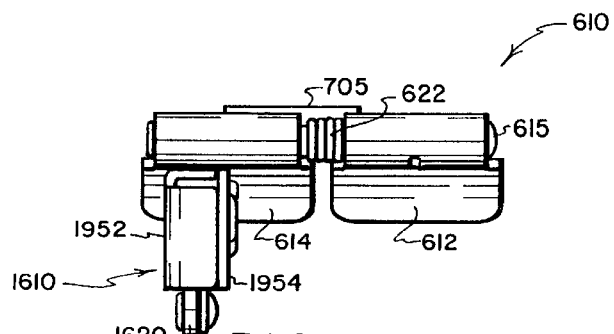

A comparison of the latch assembly 410 as depicted in FIGS. 21–25 with the latch assembly 1610 as depicted in FIGS. 29–31 readily discloses that these latch assemblies are comprised of corresponding components, many of which are, in fact, identical. Each of the latch assemblies 410, 1610 has what is referred to as a "notched housing" that cooperates with a "notched rotary latch bolt" to releasably retain one of the latch strikers 600, 810, respectively, when latched—as will be explained shortly. The most notable difference between the two latch assemblies 410, 1610 is that the "notched housing" of the latch assembly 410 utilizes only one of its side walls to define a striker receiving notch, while the latch assembly 1610 utilizes both of its side walls to define a striker receiving notch—a difference that does not alter the basic manner in which the latch assemblies 410, 1610 function.

The "notched housing" of the latch assembly 410 is defined by a pair of housing side plates 952, 954 that are interconnected by a pair of bushings 956 that extend through aligned holes formed in the housing side plates 952, 954 and have their opposite end regions deformed so as to provide rigid connections with the housing side plates 952, 954. The side plate 952 defines a U-shaped striker receiving notch 951 near one of its ends. (It will be noted that, in the latch assembly 410, the other of the side plates 954 is not of sufficient length to permit it to define an additional striker receiving notch that aligns with the striker receiving notch 951—which is the most notable difference between the latch assembly 410 and the latch assembly 1610 which has aligned U-shaped notches defined by both of its housing side walls).

The "notched housing" of the latch assembly 1610 is defined by a pair of housing side plates 1952, 1954 that are interconnected by a pair of bushings 1956 that extend through aligned holes formed in the housing side plates 1952, 1954 and have their opposite end regions deformed so as to provide rigid connections with the housing side plates 1952, 1954. The side plates 1952, 1954 define aligned U-shaped striker receiving notches 1951, 1953.

The preferred manner in which the bushings 956, 1956 have their opposite end regions deformed to establish rigid connections with the side plates 952, 954 and 1952, 1954 is described in the above mentioned U.S. Pat. No. 5,884,948.

Figure 4:
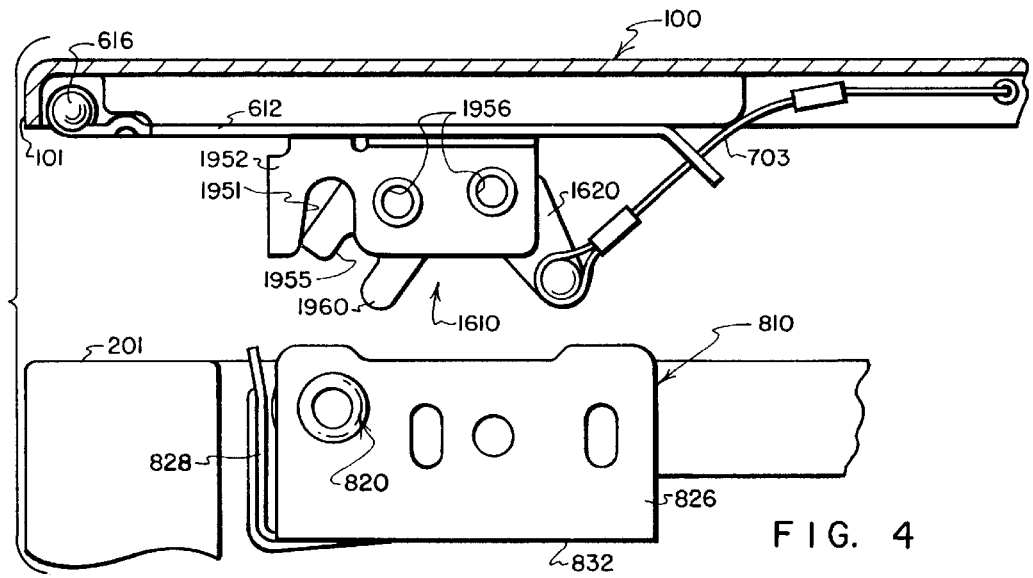
FIG. 4 is a view similar to FIG. 3 but showing the right latch-carrying hinge and and the right latch striker separated and a rotary bolt of the right latch assembly in its unlatched position, it being understood that disconnections of the left and right latch-carrying hinges from the left and right latch strikers in this manner will permit the tonneau cover to be completely removed from the truck when the presence of the tonneau cover on the truck is not desired.
Figure 3:
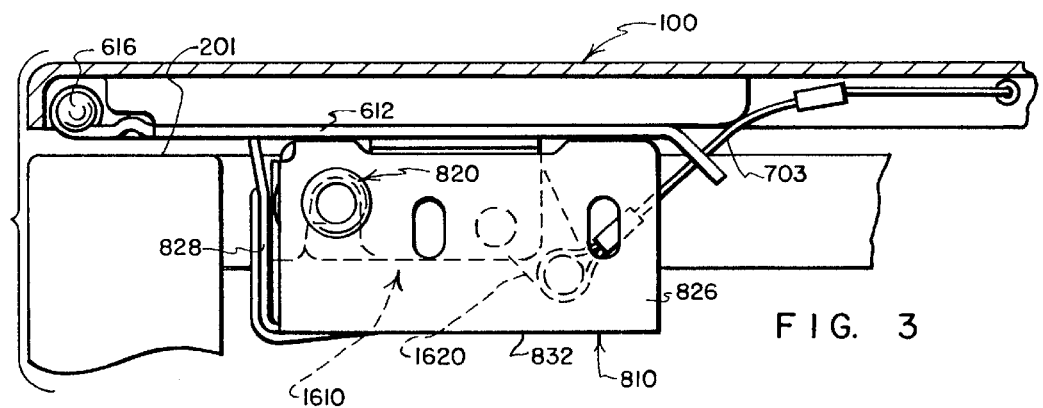
FIG. 3 is a somewhat schematic side elevational view that shows, on an enlarged scale, selected portions of the right latch-carrying hinge and the right latch striker that are utilized to releasably connect the right side of the front end region of the tonneau cover to the truck, as seen from a plane indicated by a line 3—3 in FIG. 1.

The notched housings of the latch assemblies 410, 1610 carry substantially identical "notched rotary latch bolts" 960, 1960, respectively, that are movable between latched positions and unlatched positions. The latched position of the rotary latch bolt 960 is shown in FIG. 21 and in solid lines FIG. 23, whereas the unlatched position of the rotary latch bolt 960 is shown in FIG. 22 and in broken lines in FIG. 23. The latched position of the rotary latch bolt 1960 is shown in FIG. 29, whereas the unlatched position of the rotary latch bolt 960 is shown in FIG. 4. As one of the strikers 600, 810 moves toward and into the housing-defined notches one of the latch assemblies 410, 1610, respectively, it will be received in a U-shaped notch 955, 1955 of one of the rotary latch bolts 960, 1960, respectively, and will cause the rotary latch bolt 960, 1960, respectively, to rotate from its unlatched position to its latched position.

The notched housings of the latch assemblies 410, 1610 also carry substantially identical rotary pawls 970, 1970 that engage exterior surface portions of the rotary latch bolts 960, 1960, respectively, and that cooperate with the rotary latch bolts 960, 1960 to hold the rotary latch bolts 960, 1960 in their latched positions. The rotary pawls 970, 1970 are formed integrally with the release levers 420, 1620 of the rotary latch assemblies 410, 1610, and are functional to engage the rotary latch bolts 960, 1960 when the release levers 420, 1620 are in their non-operated positions, but disengage and release the rotary latch bolts 420, 1620 when pivoted to their operated positions. The non-operated position of the release lever 420 (and of the rotary pawl 970 connected to the release lever 420) is shown in FIG. 21 and in solid lines in FIG. 23, whereas the operated position of the release lever 420 (and of the rotary pawl 970) is shown in FIG. 22 and in broken lines in FIG. 23. The non-operated position of the release lever 1620 (and of the rotary pawl 1970 connected to the release lever 1620) is shown in FIG. 29, whereas the operated position of the release lever 1620 is shown in broken lines in FIG. 29.

The preferred configuration of the notches 951, 1951, 1953 and the manner in which the notches 1951, 1953 preferably are aligned to receive a striker is described in greater detail in the referenced Rotary Latch Patents.

Also housed between the side plates 952, 954 (in addition to the rotary jaw 960 and the rotary pawl 970), and also housed between the side plates 1952, 1954 (in addition to the rotary jaw 1960 and the rotary pawl 1970) is a torsion coil spring 980, 1980 that has coils that extend about the bushings 956, 1956. End regions of the spring 980 engage the jaw and pawl 960, 970, and end regions of the spring 1980 engage the jaw and pawl 1960, 1970, respectively, to bias these rotary elements (about rotation axes defined by the bushings 956, 1956 on which these elements are rotatably mounted) in a manner (described in the referenced Rotary Latch Patents) that permits interactively engaging formations of these elements (shown by hidden lines in FIG. 23) to cooperate to retain an associated one of the strikers 600, 810 in latched engagement with the associated latch assembly 410, 1610 until the associated release lever 420, 1620 is pivoted from its non-operated position to its operated position to release the grip of the associated rotary pawl 970, 1970 on the associated rotary jaw 960, 1960 so the associated jaw 960, 1960 can pivot under the influence of the associated spring 980, 1980 to release the associated striker 600, 810. This type of rotary-pawl-controlled rotary-jaw latching action is well known to and understood by those who are skilled in the art, and is further illustrated and described in the referenced Rotary Latch Patents and in other patents that are referred to in these patents.

Unlatching movement of the release lever 420 of the rotary latch assembly 410. (and concurrent unlatching movement of the release lever 520 of the rotary latch assembly 510) is effected by grasping and squeezing together the slide members 333, 334 of the latch operating assembly 310 at a time when the locking member 350 is positioned by the key-operated lock cylinder 360 in the "unlocked" position depicted in FIG. 12 (i.e., when the locking member 350 extends parallel to the end formations 393, 394 so as to permit the end formations 393, 394 to slide past the locking member 350 as the slide members 333, 334 are moved toward each other).

As the release lever 420 pivots to its operated position (shown in FIG. 22), the rotary pawl 970 is pivoted to a position where interactive formations of the rotary jaw 960 and the rotary pawl 970 disengage to permit the jaw 960 to rotate to its unlatched position (also shown in FIG. 22) whereupon the notched housing and the notched rotary latch bolt of the rotary latch assembly 410 no longer latchingly engage the striker 600 (i.e., the striker 600 is "released"). So long as the rotary jaw 960 of the rotary latch assembly 410 is in its unlatched position (depicted in FIGS. 4 and 22), the striker 600 can always be slammed into latching engagement with the rotary jaw 960—and, the same is true with respect to the identical rotary jaws of the rotary latch assemblies 510, 1610, 1710 and their associated strikers 600, 810, 910.

Figure 6:
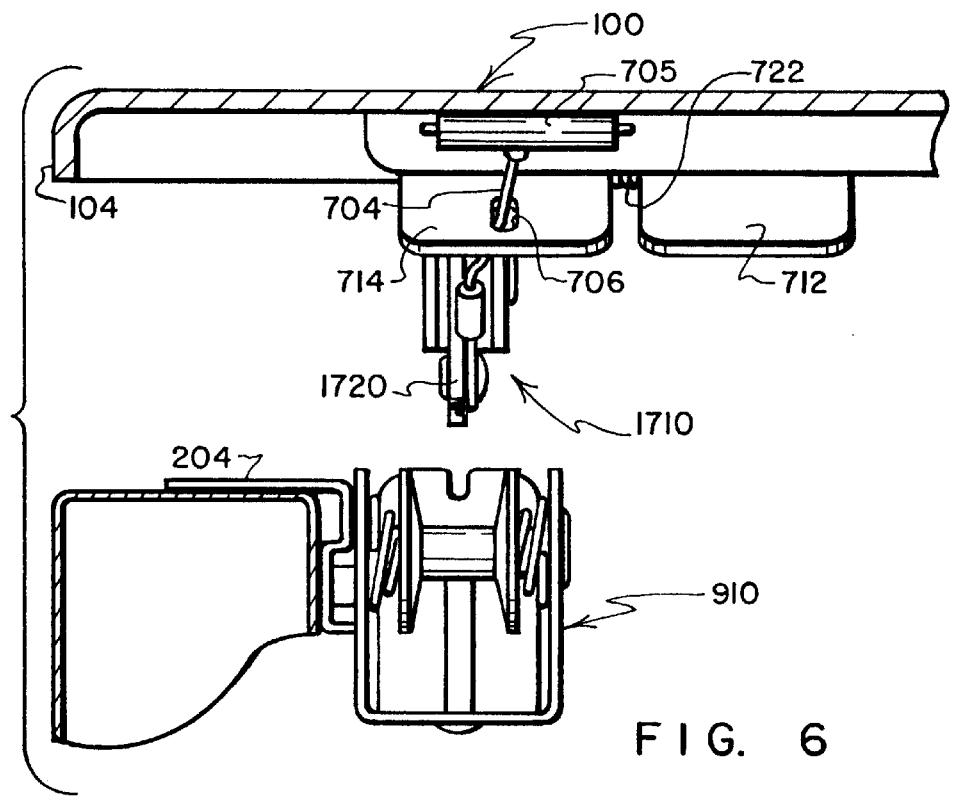
FIG. 6 is a view similar to FIG. 5 but showing the left latch-carrying hinge and the left latch striker separated, and a rotary bolt of the left latch assembly in its unlatched position.
Figure 5:
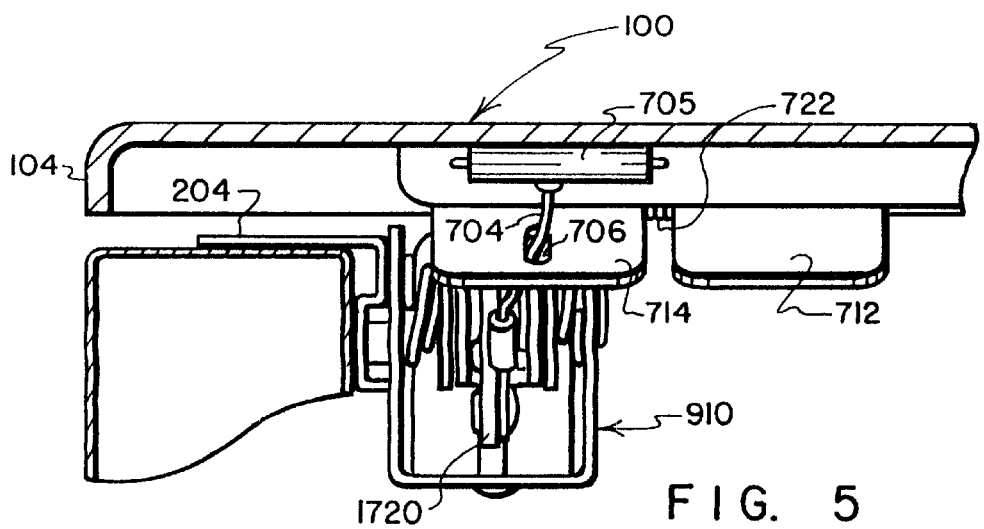
FIG. 5 is a somewhat schematic end elevational view of the left latch-carrying hinge and the left latch striker, as seen from a plane indicated by a line 5—5 in FIG. 1.
Figure 7:
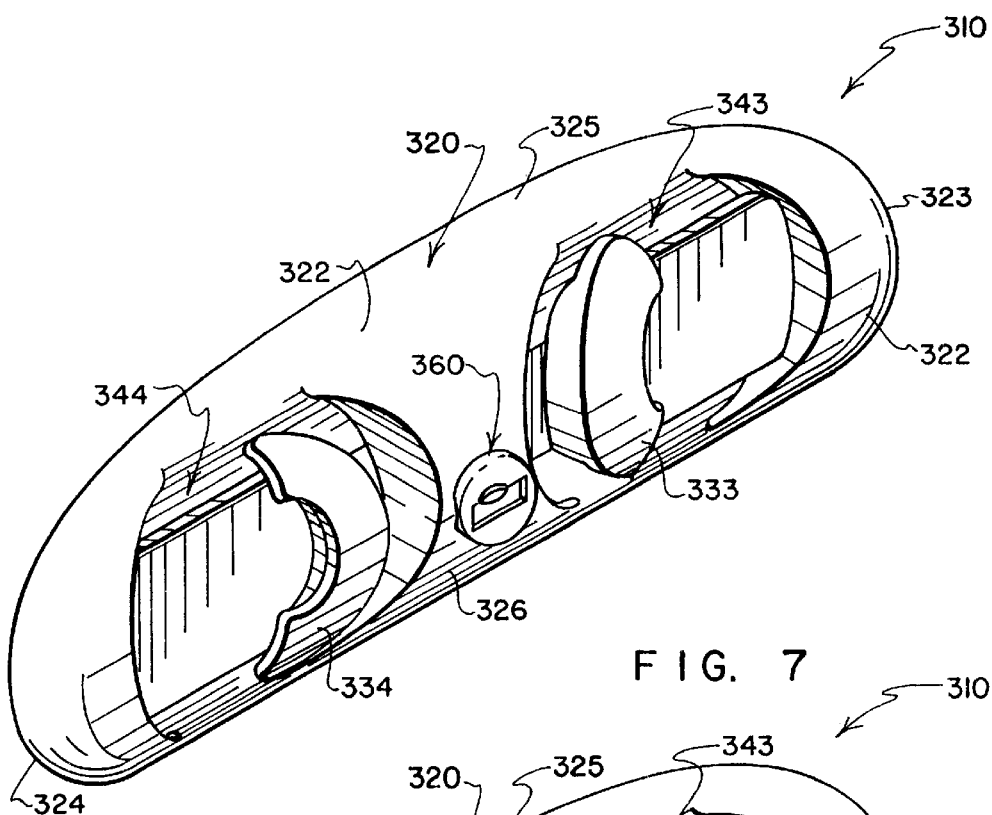
FIG. 7 is a perspective view, on an enlarged scale, of a latch operating assembly that has a pair of finger-engageable operating members or "slides" in the "non-operated" positions they normally occupy when the tonneau cover is latched closed.
Figure 8:
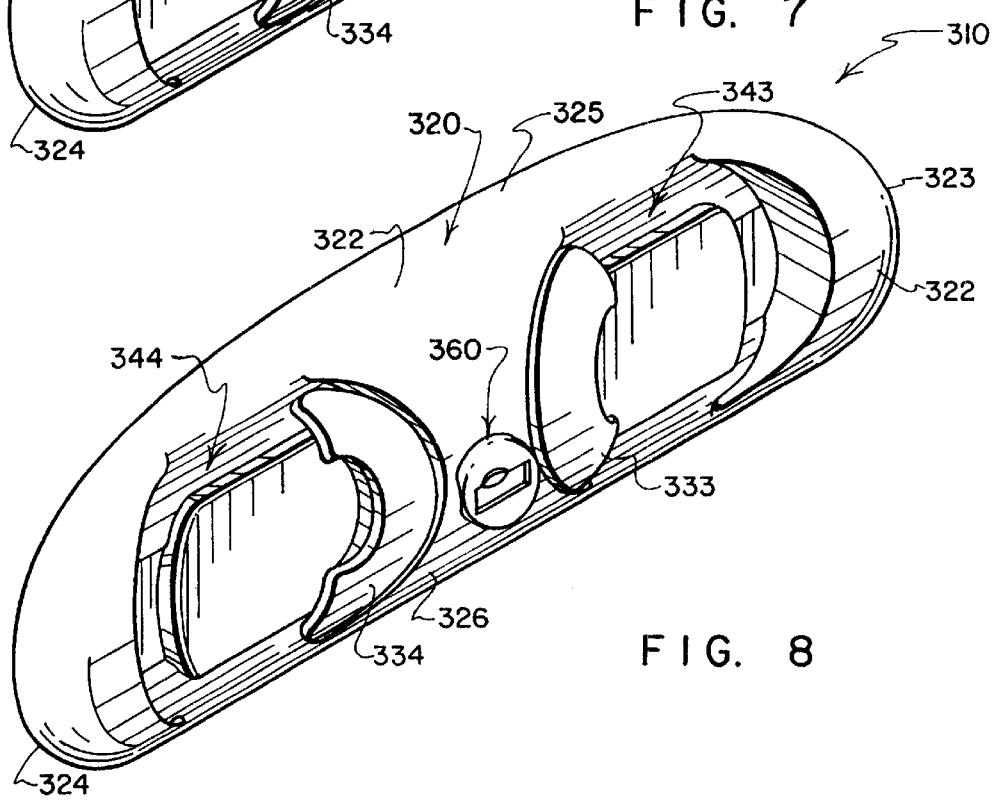
FIG. 8 is a perspective view similar to FIG. 7 but with the finger-engageable slides moved toward each other to "operated" positions (as is needed to unlatch and open the tonneau cover, when desired)
Figure 9:
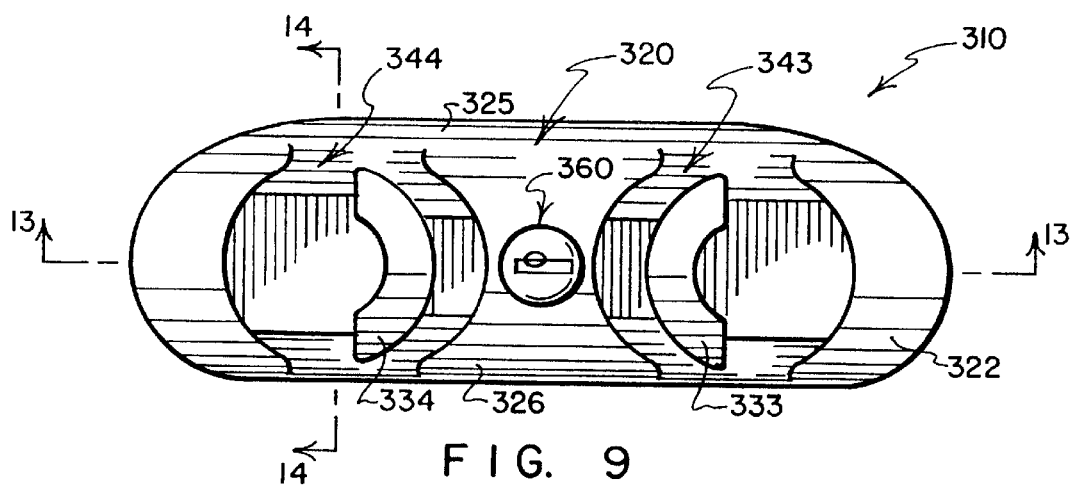
FIG. 9 is a front view of the latch operating assembly of FIG. 7.

Unlatching movement of the release lever 1620 of the rotary latch assembly 1610 (and, in an identical manner, unlatching movement of the release lever 1720 of the rotary latch assembly 1710) is effected quite simply by grasping the handle 705 and pulling on the release cable 703 (and likewise by pulling on the release cable 704 insofar as operation of the release lever 1720 is concerned). As can be seen in FIGS. 1, 5 and 6, the hinge arms 614, 714 have curved outer end regions that provide guide holes 706 through which the release cables 703, 704 extend. The release cables 703, 704 are positioned for ready operator access and guided in their movements by the fact that they extend through the holes 706.

Inasmuch as the handles 705 of the release cables 703, 704 are housed within the cargo compartment 200 when the tonneau cover 100 is closed and therefore cannot be accessed for manual operation until the tonneau cover 100 has been pivoted to its open position by utilizing the latch operating mechanism 310 to operate the rear latch assemblies 410, 510, the front latch assemblies 1610, 1710 will remain in securely latched engagement with the latch strikers 810, 910 unless and until the tonneau cover 100 has been opened and the release cables 703, 704 manually pulled to unlatch the engagements between the front latch assemblies 1610, 1710 and the latch strikers 810, 910.

Referring to FIGS. 1, 3, 4 and 26 wherein the right latch-carrying hinge assembly 610 is depicted, and to FIGS. 1, 5 and 6 wherein features of the left latch-carrying hinge assembly 710 are shown, the latch-carrying hinge assemblies 610, 710 have first hinge arms 612, 712 and second hinge arms 614, 714 that are interconnected by pivot pins 616, 716. The pivot pins 616, 716 have ends 615, 715 that are welded to the second hinge arms 614, 714 to ensure that the pivot pins 616, 716 rotate with the second hinge arms 614, 714 about the pivot axis 700.

Torsion springs 620, 720 are provided that have coils that wrap about their associated pivot pins 616, 716, and that have opposite end regions that. engage the first and second hinge arms at a short distance spaced from the pivot axis 700. The torsion springs 620, 720 serve to bias the second hinge arms 614, 714 relative to the first hinge arms 612, 712 to hold the second hinge arms in engagement with the underside of the tonneau cover 100 when the latch assemblies 1610, 1710 are disengaged from the latch strikers 810, 910. By this arrangement, when the tonneau cover 100 is removed from the truck, it is assured that the latch-carrying second arms 614, 714 will not swing loosely about but rather will remain in engagement with the underside of the tonneau cover 100. This biasing of the latch-carrying second arms 614, 714 into engagement with the underside of the tonneau cover 100 also is helpful when the time is at hand to reinstall the tonneau cover 100 on the truck, for it helps to ensure that the latch assemblies 1610, 1710 are oriented correctly to be slammed into engagement with the latch strikers 810, 910, respectively.

To ensure that the latch-carrying hinge assemblies 610, 710 are not utilized to open the tonneau cover 100 to unacceptable heights, it is desirable to limit the possible range of relative movement that can take place about the pivot axis 700 between the first and second arms 612, 614 (and between the first and second arms 712, 714). Since the pivot pin 616 has its end region 615 welded to the second arm 614 and therefore pivots about the axis 700 with the second arm 614 (and since the pivot pin 716 has its end region 715 welded to the second arm 714 and therefore pivots about the axis 700 with the second arm 714) it is possible to limit the permitted range of relative rotation about the axis 700 between the first and second arms 612, 614 (and between the first and second arms 712, 714) by providing the pin 616 and the first arm 612 (and the pin 716 and the first arm 712) with stop formations that engage at opposite ends of the permitted range of relative rotation.

Referring to FIGS. 1 and 26–28, a set of interactive stop formations that limits relative rotation between the first and second arms 612, 614 is indicated generally by the numeral 1000. The interactive stops 1000 are defined by a radially extending pin 1002 that is carried in a radially extending hole 1004 formed in the pivot pin 616, and by a slot 1006 defined by the first arm 612 that receives an outer end region of the pin 1002. Relative rotation between the pivot pin 616 and the first arm 612 (and hence between the first and second arms 612, 614) is limited by the extent to which the the outer end of the pin 616 can move between opposite ends of the notch 1004—a range of movement that preferably is limited to around thirty-five degrees so that the tonneau cover 100 will not be pivoted open to an unsuitable height. An identical set of interactive stops that limit relative rotation between the first and second arms 712, 714 is indicated by the numeral 1010 in FIG. 1.

The first hinge arms 612, 712 are, of course, connected to the tonneau cover 100, while the second hinge arms 614, 714 are, as has been described, removably connected to the side rails 203, 204 (FIG. 1) by virtue of latching engagements that are provided between the latch assembly 1610 and the latch striker 810, and between the latch assembly 1710 and the latch striker 910. Inasmuch as the latch strikers 810, 910 are identical, only the striker 810 will be described.

Figure 32:
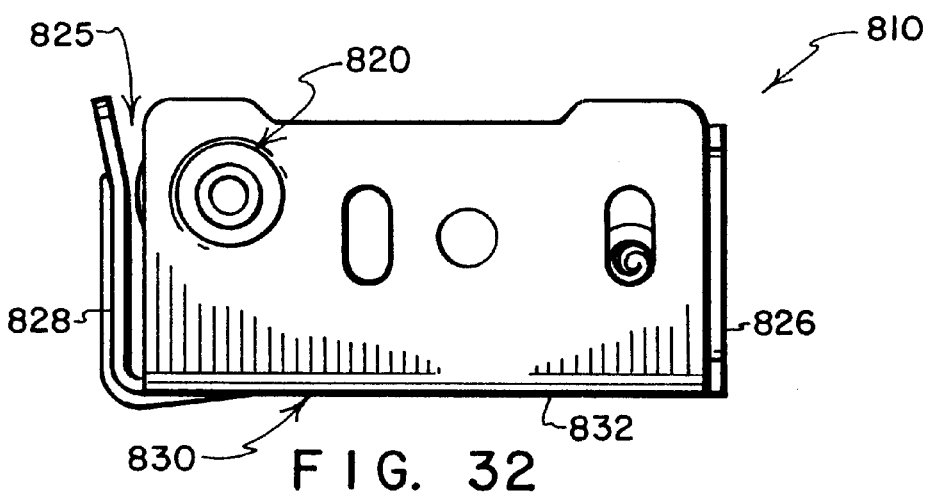
FIG. 32 is a side elevational view of the right latch striker that cooperates with the right latch-carrying hinge assembly shown in FIG. 26.
Figure 33:
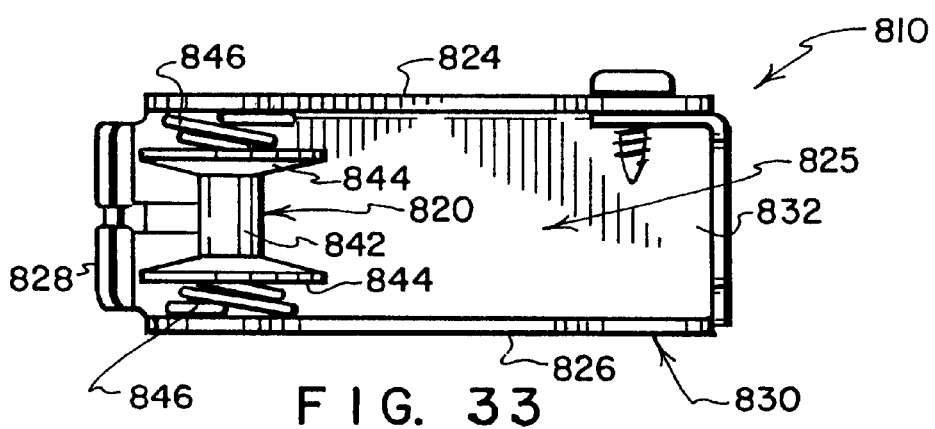
FIGS. 33 and 34 are top plan and right end views thereof.
Figure 34:
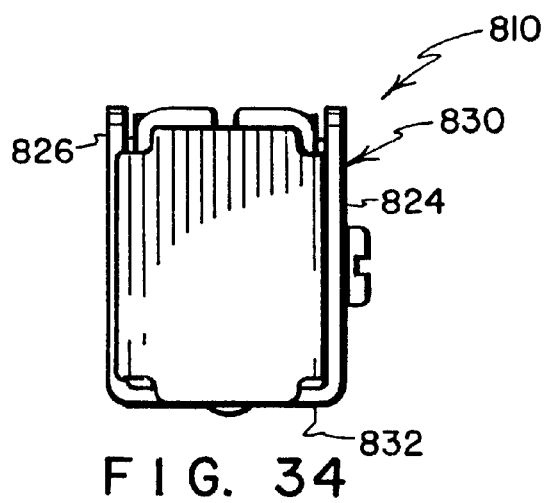

Referring to FIGS. 32–34, the latch striker 810 has a protective outer housing 830 that is formed as a stamping of steel so as to provide opposed upstanding side walls 824, 826 and an upstanding end wall 828 that are connected by a transversely extending bottom wall 832. The side walls 824, 826 and the bottom wall 832 extend in a U-shaped manner about a latch-receiving chamber 825.

Referring to FIGS. 33 and 34, a post assembly 820 extends through the chamber 825 between the side walls 824, 826 and has its opposite ends connected to the side walls 824, 826. The post assembly 820 includes an elongate rivet 840 that has its opposite ends crimped into engagement with the side walls 824, 826. A bushing 842 is mounted on the rivet 840 at a central location between the side walls 824, 826. It is the bushing 842 that is latchingly engaged by being received cooperatively in the latch assembly's notches 1951, 1953, 1955, as described above. Tapered washers 844 are carried on the rivet at locations on opposite ends of the bushing 842. Compression coil springs 846 are carried near opposite end regions of the rivet 840 to bias the washers 844 toward the bushing. The tapered washers 844 engage opposite sides of the housing of the latch assembly 1610 when the latch assembly 1610 latchingly engages the post assembly 820 of the latch striker 810, and the springs 846 bias the housing of the latch assembly 1610 away from the side walls 824, 826 toward a centered position within the latch-receiving chamber 825.

Figure 35:
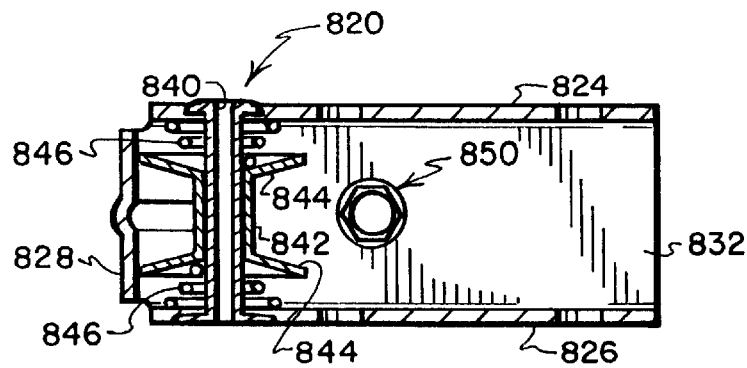
FIG. 35 is a top plan view similar to FIG. 33 but showing a portion of the right latch striker in cross-section, and showing a biasing mechanism that can be added to the right and left latch strikers to assist in lifting the right and left hinge-carried latch assemblies when they are unlatched from the right and left latch strikers.
Figure 36:
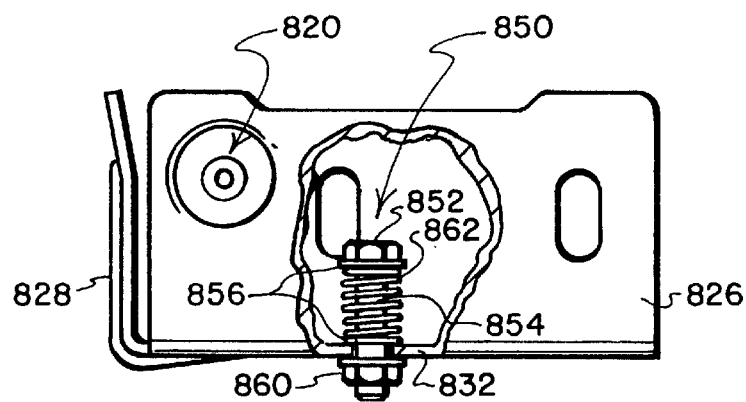
FIG. 36 is a side elevational view thereof with a side portion of the right latch striker broken away; and, FIG. 37 is a view similar to FIG. 36 but showing the added biasing mechanism engaging the right latch housing when the right hinge-carrying latch assembly latchingly engages the striker.
Figure 37:
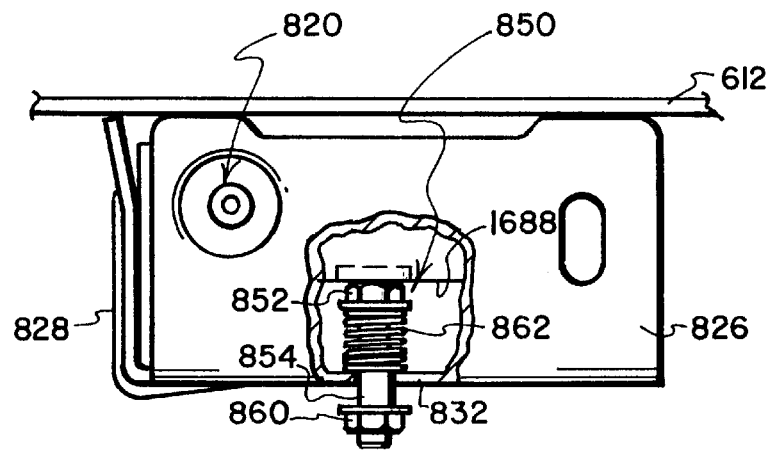

Referring to FIGS. 35–37, an optional spring-biased plunger assembly 850 may be carried by the bottom wall 832 for engaging the housing of the latch assembly 1610 to bias the latch assembly 1610 upwardly—so that, when the latch assembly 1610 is unlatched from engagement with the latch striker 810, the latch assembly 1610 will tend to move upwardly and out of the latch-receiving chamber 825. This upward biasing of the latch assembly 1610 (and a corresponding upward biasing of the latch assembly 1710 by an identically configured biased plunger assembly carried by the latch striker 910) may be desired to assist in uncoupling the tonneau cover 100 from the truck.

Referring to FIG. 36, the plunger assembly includes a capscrew 852 that carries a bushing 854, extend through a hole formed through the bottom wall 832. Upper and lower washers 856 are carried at opposite ends of the bushing 854, and a nut 860 is threaded onto the capscrew 852 to clamp the washers 856 against opposite ends of the bushing 854. The washers 856 prevent the head of the capscrew 852 and the locknut 860 from passing through the bottom wall hole that receives the bushing 854 in a slip fit. A compression coil spring 862 is interposed between the bottom wall 832 and the upper washer 856 to bias the plunger assembly 850 upwardly.

When the rotary latch 1610 is inserted between the opposed side walls 824, 826 to latchingly engage the striker post assembly 820 of the latch striker 810, a portion 1688 (see FIG. 37) of the housing of the latch 1610 engages the head of the capscrew 852 and causes the spring 862 to be compressed as downward movement of the latch 1610 presses the capscrew 852 downwardly to the position that is illustrated in FIG. 37 wherein the latch 1610 has latchingly engaged the striker unit 810. By this arrangement, when the latch 1610 is tripped (i.e., operated) to release the striker unit 810, the biasing action of the spring 862 on the latch 1610 will push the latch 1610 (and, with it, the hinge 610 and the front end region of the tonneau cover 100) upwardly to assist with removal of the tonneau cover 100 from the truck.

A feature of the removable tonneau cover latching system of the present invention is that storage of the removed cover 100 can be facilitated by mounting a pair of the striker units 810, 910 on the wall of a garage or other building at a height above the floor that slightly exceeds the length of the removed tonneau cover 100 and at a spaced-apart distance that corresponds to the spacing of the latch assemblies 1610, 1710—so that the latch assemblies 1610, 1710 can be snapped into engagement with the wall-mounted striker units to support the removed tonneau cover 100 and to store the cover 100 efficiently when it is not in use on a pickup truck or the like.

While the invention has been described with a certain degree of particularity, it will be understood that the present disclosure of the preferred embodiment has been made only by way of example, and that numerous changes in the details of construction and the combination and arrangement of elements can be resorted to without departing from the true spirit and scope of the invention. As those who are skilled in the art will readily understand, the use of so-called "left" and "right" components gives the resulting installation on a closure a balanced and symmetrical appearance that may not be required in order to achieve proper function. Likewise, repositionings of the described components also can be made in order to accommodate the needs of a variety of tonneau covers or other closures without departing from the true spirit and scope of the invention.

It is intended that the claims that follow protect such novel features as reside in the disclosed latch, lock and hinge system, components thereof, and equivalents thereto.

What is claimed is:

1. A set of rotary latch assemblies for being connected to a cargo compartment closure of a vehicle for at least assisting to hold the closure in a closed position, comprising:

a) first and second rotary latch assemblies for being connected to first and second hinges, respectively, wherein: i) the first and second hinges are connected to first and second spaced-apart regions of the closure, respectively; ii) the first and second hinges cooperate to pivot the closure about a common pivot axis for movement relative to the cargo compartment between an open position and the closed position; and, iii) the first and second rotary latch assemblies are engageable, when the closure is in the closed position, with first and second latch strikers, respectively, that are connected to the vehicle;

b) third and fourth rotary latch assemblies for being connected to the closure at third and fourth spaced-apart regions of the closure, respectively, wherein the third and fourth rotary latch assemblies are engageable, when the closure is in the closed position, with third and fourth latch strikers, respectively, that are connected to the vehicle;

c) wherein each of the first, second, third and fourth rotary latch assemblies includes:
      i) a housing that defines a notch for receiving an associated one of the first, second, third and fourth latch strikers;
      ii) a latch bolt connected to the housing for rotation between A) a latched position wherein a notch defined by the bolt cooperates with the notch defined by the housing to latchingly engage said associated one of the first, second, third and fourth latch strikers, and B) an unlatched position wherein said associated one of the first, second, third and fourth latch strikers can be moved into and out of receiving engagement with the notch defined by the housing; and,
      iii) means for retaining the latch bolt in the latched position once the latch bolt is rotated to the latched position, and for being operated to release the latch bolt to permit the latch bolt to rotate away from the latched position toward the unlatched position.

2. The set of rotary latch assemblies of claim 1 additionally including a latch operator assembly connected to at least a chosen pair of the first, second, third and fourth rotary latch assemblies to permit the means of the chosen pair of rotary latch assemblies to be operated concurrently to release the latch bolts of the chosen pair of rotary latch assemblies.

3. The set of rotary latch assemblies of claim 2 wherein the latch operator assembly includes:
   a) an elongate housing for being mounted on the closure at a location that is remote from at least one of the rotary latch assemblies of the chosen pair of rotary latch assemblies, wherein the elongate housing defines first and second recesses located near opposite end regions of the elongate housing;
   b) first and second manually operable slides movable in the first and second elongate recesses, respectively, between operated positions and non-operated positions; and,
   c) means for connecting each of the first and second slides to a separate one of the rotary latch assemblies of the chosen pair of latch assemblies for enabling the first and second manually operable slides, when moved concurrently from the non-operated positions to the operated positions, to concurrently release the latch bolts of the chosen pair of rotary latch assemblies.

4. The set of rotary latch assemblies of claim 3 wherein the elongate housing has a generally C-shaped cross-section defined at least in part by a generally convex front wall and a generally concave rear wall, with the concave configuration of the rear wall defining a mounting surface for engaging a convex surface defined by the closure, and with the convex configuration of the front wall cooperating with the concave configuration of the rear wall to give the housing a relatively thin cross-section.

5. The set of rotary latch assemblies of claim 3 wherein the latch operator assembly additionally includes locking means for selectively preventing and permitting the first and second manually operable slides from moving away from the non-operated positions toward the operated positions.

6. The set of rotary latch assemblies of claim 3 additionally including means for biasing the first and second manually operable slides away from the operated positions toward the non-operated positions.

7. The set of rotary latch assemblies of claim 1 wherein the first and second latch strikers each has a latch striker housing of generally U-shaped cross-section that has a base wall that connects a pair of substantially parallel extending, spaced side walls that cooperate to extend about a central region configured to receive the housing of an associated one of the first and second rotary latch assemblies when the closure is in the closed position, and a formation extending into the central region from at least one of the side walls for being latchingly engaged by the associated one of the first and second rotary latch assemblies when the closure is in the closed position.

8. The set of rotary latch assemblies of claim 7 wherein the first and second latch strikers each has means for extending from at least a chosen one of the base wall and the spaced side walls for pressing resiliently against the housing of the associated one of the first and second rotary latch assemblies when the associated one of the first and second rotary latch assemblies is received in the central region.

9. The set of rotary latch assemblies of claim 1 wherein at least a designated one of the first, second, third and fourth rotary latch assemblies has a flexible, elongate release cable for operating the associated one of said means, with one end region of the release cable being connected to said associated one of said means, and with another end region of the release cable being provided with a manually graspable handle formation.

10. The set of rotary latch assemblies of claim 9 wherein the manually graspable handle formation is positioned by said designated one of the first, second, third and fourth rotary latch assemblies to be accessible for being manually grasped only when the closure is in the open position.

11. The set of rotary latch assemblies of claim 1 wherein the first and second rotary latch assemblies have first and second flexible release cables connected to said means of the first and second rotary latch assemblies for being manually operated to release the latch bolts of the first and second rotary latch assemblies, respectively, and the first and second hinges have first and second formations for engaging the first and second flexible release cables, respectively, to guide movements of the first and second flexible release cables when tension forces are applied to the first and second flexible release cables to release the latch bolts of the first and second rotary latch assemblies, respectively.

12. A latch and hinge system 1) for establishing a pivotal connection between a cargo compartment cover and body structure that defines a cargo compartment of a vehicle to permit the cover to pivot between an open position providing access to the cargo compartment and a closed position closing at least a selected portion of the cargo compartment, 2) for releasably retaining the cover in the closed position, and 3) for permitting the cover to be disconnected from and reconnected to the body structure, comprising:
   a) a first latch striker and a second latch striker for being connected to the body structure at spaced locations along side regions of the cargo compartment;
   b) a first latch assembly for being connected to the cover and for being positioned to engage the first latch striker to establish latching engagement between the first latch assembly and the first latch striker to latch the cover to the body structure when the cover is in the closed position;
   c) a hinge having a first arm for connection to the cover, and having a second arm pivotally connected to the first arm for pivotal movement about a pivot axis;
   d) a second latch assembly connected to the second arm for being positioned by the second arm to engage the second latch striker to establish latching engagement between the second latch assembly and the second latch striker to connect the cover and the second arm for concurrent pivotal movement about the pivot axis when the cover is in the open position, and to latch the cover to the body structure when the cover is in the closed position;
   e) first means for releasing the latching engagement between first latch assembly and the first latch striker without releasing the latching engagement between the second latch assembly and the second latch striker to thereby permit the cover to be pivoted with the second arm about the pivot axis between the open position and the closed position; and,
   f) second means for releasing the latching engagement between the second latch assembly and the second latch striker to disconnect the cover from the body structure.

13. The system of claim 12 wherein the second means can only be accessed to release the latching engagement between the second latch assembly and the second latch striker after 1) the first means has released the latching engagement between the first latch assembly and the first latch striker, and 2) the cover has been pivoted out of the closed position.

14. The system of claim 12 wherein the first means for releasing latching engagement is configured to be manually operated from outside the cargo compartment when the cover is in the closed position, and wherein the second means for releasing latching engagement is configured to be manually operated from outside the cargo compartment only when the cover is pivoted out of the closed position.

15. The system of claim 12 wherein the first latch assembly has a housing that mounts a first rotary bolt for rotation between an unlatched position and a latched position wherein the first rotary bolt and the first housing cooperate, when the cover is in the closed position, to receive the first latch striker in notches that are defined by the first housing and by the first rotary bolt to establish said latching engagement between the first latch assembly and the first latch striker.

16. The system of claim 15 wherein the first rotary bolt is configured to be engaged and moved by the first latch striker as the cover is moved toward and into the closed position to cause the first rotary bolt to be moved toward and into the latched position, whereby the cover can be slammed to the closed position to establish said latching engagement between the first rotary latch and the first latch striker.

17. The system of claim 12 wherein the second latch assembly has a housing that mounts a second rotary bolt for rotation between an unlatched position and a latched position wherein the second rotary bolt and the second housing cooperate, when the cover is in the closed position, to receive the second latch striker in notches that are defined by the second housing and by the second rotary bolt to establish said latching engagement between the second latch assembly and the second latch striker.

18. The system of claim 17 wherein the second rotary bolt is configured to be engaged by the second latch striker as the second latch assembly and the second latch striker are moved toward each other to pivot the second rotary bolt to the latched position to establish said latching engagement between the second latch assembly and the second latch striker, whereby the cover can be slammed toward the second arm of the hinge to establish said latching engagement between the second rotary latch and the second latch striker.

19. The system of claim 12 wherein: a) the first latch assembly includes a first latch bolt that is movable between an unlatched position of the first latch bolt and a latched position of the first latch bolt wherein the first latch bolt retainingly engages the first latch striker; and, b) the first latch bolt is configured to be engaged and moved by the first latch striker from the unlatched position of the first latch bolt to the latched position of the first latch bolt during movement of the cover toward and into the closed position.

20. The system of claim 12 wherein: a) the second latch assembly includes a second latch bolt that is movable between an unlatched position of the second latch bolt and a latched position of the second latch bolt wherein the second latch bolt retainingly engages the second latch striker; and, b) the second latch bolt is configured to be engaged and moved by the second latch striker from the unlatched position of the second latch bolt to the latched position of the second latch bolt during movement of the cover toward the second arm.

21. The system of claim 12 wherein the second means includes a flexible cable that carries a manually graspable formation that can be grasped and moved to tension the flexible cable to release the engagement between the second latch assembly and the second latch striker, and the second arm has a formation that engages and guides movement of the flexible cable.

22. A latch and hinge system 1) for establishing a pivotal connection between a generally rectangular cargo compartment cover and body structure that defines a generally rectangular cargo compartment of a vehicle to permit the cover to pivot between an open position providing access to the cargo compartment and a closed position wherein the cover closes the cargo compartment, 2) for releasably retaining the cover in the closed position, and 3) for permitting the cover to be disconnected from and reconnected to the body structure, a) wherein the generally rectangular cargo compartment has opposed front and rear sides, opposed left and right sides, and left-front, right-front, left-rear and right-rear corner regions located at the junctures of the front and rear sides with the left and right sides, b) wherein the cover has opposed front and rear edges configured to extend near the front and rear sides of the cargo compartment, opposed left and right edges configured to extend near the left and right sides of the cargo compartment, and left-front, right-front, left-rear and right-rear corner areas located at the junctures of the front and rear edges with the left and right edges, and, c) wherein the pivotal connection that is established by the latch and hinge system permits the cover to pivot relative to the body structure about a pivot axis that extends along and near to the front edge of the cover; comprising:

a) a left-front latch striker, a right-front latch striker, a left-rear latch striker, and a right-rear latch striker for being connected to the body structure near the left-front, right-front, left-rear and right-rear corner regions, respectively;

b) a left-rear latch assembly and a right-rear latch assembly for being connected to the cover near the left-rear and right-rear corner areas, respectively, and for being engageable with the left-rear and right-rear strikers, respectively, to establish latching engagements between the left-rear latch assembly and the left-rear striker, and between the right-rear latch assembly and the right-rear striker to latch the cover to the body structure when the cover is in the closed position;

c) a left-front hinge having a first hinge arm of the left-front hinge connected to the cover near the left-front corner area and a second hinge arm of the left-front hinge pivotally connected to the first hinge arm of the left-front hinge to permit relative pivotal movement therebetween about said pivot axis, and a right-front hinge having a first hinge arm of the right-front hinge connected to the cover near the right-front corner area and a second hinge arm of the right-front hinge pivotally connected to the first hinge arm of the right-front hinge to permit relative pivotal movement therebetween about said pivot axis;

d) a left-front latch assembly connected to the second arm of the left-front hinge for being positioned by the second arm of the left-front hinge to engage the left front latch striker to establish latching engagement between the left-front latch assembly and the left-front latch striker to connect the cover and the second arm of the left-front hinge for concurrent pivotal movement about said pivot axis when the cover is in the open position, a right-front latch assembly connected to the second arm of the right-front hinge for being positioned by the second arm of the right-front hinge to engage the right front latch striker to establish latching engagement between the right-front latch assembly and the right-front latch striker to connect the cover and the second arm of the right-front hinge for concurrent pivotal movement about said pivot axis when the cover is in the open position, with the latching engagement between the left-front and right-front latch assemblies and the left-front and right-front striker assemblies also serving to latch the cover to the body structure when the cover is in the closed position;

e) first means for releasing the latching engagements between the left-rear and right-rear latch assemblies and the left-rear and right-rear latch strikers without releasing the latching engagements between the left-front and right front latch assemblies and the left-front and right-front strikers to thereby permit the cover to be pivoted with the second arms of the left-front and right-front hinges about said pivot axis between the open position and the closed position; and, f) second means for releasing the latching engagement between the left-front and right-front latch assemblies and the left-front and right-front striker assemblies to disconnect the cover from the body structure.

23. The system of claim 22 wherein at least a selected one of the left-front, right-front, left-rear and right-rear latch assemblies includes a housing and a rotary latch bolt connected to the housing for rotation between an unlatched position and a latched position wherein the selected latch assembly is operable to establish latching engagement with an associated one of the left-front, right-front, left-rear and right-rear latch strikers, and means for retaining the rotary latch bolt in the latched position until an associated one of the first and second means is operated to release the latching engagement between the selected latch assembly and the associated one of the latch strikers.

24. The system of claim 23 wherein the said associated striker includes a U-shaped cage structure having opposed side walls with a rod-like striker formation extending therebetween that is engaged by the said selected one of the latch assemblies, and having means for biasing the housing of the said selected one of the latch assemblies away from each of the opposed side walls.

25. The system of claim 24 wherein the said housing of the said selected one of the latch assemblies is connected to an associated second arm of an associated one of the left and right hinges, and the said associated second arm is configured to engage at least one of the opposed side walls of the U-shaped cage when the cover is in the closed position to assist in supporting the cover atop the associated one of the left and right hinges.

26. The system of claim 22 wherein the first means includes a latch operator assembly connected to the cover and to the left-rear and right-rear latch assemblies for concurrently releasing the latching engagements between the left-rear and right-rear latch assemblies and the left-rear and right-rear latch strikers.

27. The system of claim 26 wherein the latch operator assembly includes an elongate housing having left and right side portions, a left operator movably connected to the left side portion, a right operator movably connected to the right side portion, a left cable connecting the left operator to the left-rear latch assembly, a right cable connecting the right operator to the right-rear latch assembly, and the left and right operators are positioned sufficiently closely together to permit their being moved currently toward each other to operate the left-rear and right-rear latch assemblies to release the latching engagement between the left-rear and right-rear latch assemblies and the left-rear and right-rear latch strikers in response to force being applied to the left and right operators by fingers of a single hand.

28. The system of claim 27 wherein the elongate housing has a generally C-shaped cross-section defined at least in part by a generally convex front wall and a generally concave rear wall, with the concave configuration of the rear wall defining a mounting surface that substantially conforms to a convex surface defined by the cover, and with the convex configuration of the front wall cooperating with the concave configuration of the rear wall to give the housing a relatively thin cross-section.

29. The system of claim 27 wherein each of the left-front, right-front, left-rear and right-rear latch assemblies includes a notched housing that mounts a notched rotary bolt for movement between latched and unlatched positions wherein an associated one of the latch strikers is latchingly engaged in notches defined by the notched housing and by the notched rotary bolt.

30. The system of claim 29 wherein each of the left-front, right-front, left-rear and right-rear latch assemblies includes biasing means for biasing the rotary bolt toward the unlatched position.

31. The system of claim 30 wherein each of the left-front, right-front, left-rear and right-rear latch assemblies includes a release lever pivotally connected to the housing for movement between a release position wherein the release lever permits the rotary bolt to rotate under the influence of the biasing means toward the unlatched position, and a retaining position wherein the release lever engages the rotary bolt to hold the rotary bolt in the latched position.

32. The system of claim 22 wherein the second means includes a left release that can be manually operated to release the latching engagement between the left-front latch assembly and the left-front striker, and a right release that can be manually operated to release the latching engagement between the right-front latch assembly and the right-front striker, and wherein the left and right releases configured to be accessible for manual operation only after the cover has been pivoted to the open position.

33. The system of claim 32 wherein the left release includes a left cable that can be manually pulled when the cover is in the open position to release the latching engagement between the left-front latch assembly and the left-front striker, and wherein the right release includes a right cable that can be manually pulled when the cover is in the open position to release the latching engagement between the right-front latch assembly and the right-front striker.

34. A latch and hinge combination for compactly establishing separate pivotal and removable connections between a cargo compartment cover and body structure that defines a cargo compartment of a vehicle, comprising:

a) a hinge having a first arm for connection to the cover, and a second arm pivotally connected to the first arm for pivotal movement about a pivot axis of the hinge;

b) a latch striker for connection to the body structure; and, c) a latch assembly connected to the second arm and having movable latch components that are movable relative to a housing of the latch assembly between a latched position latchingly engaging the striker and un-latched position disengaged from the striker 1) for establishing, when the movable latch components are moved to their latched position, a rigid connection between the second arm and the body that will permit the cover and the second arm to pivot together about the pivot axis of the hinge, and 2) for disengaging the striker, when the movable latch components are moved to their unlatched position, to permit the cover to be completely removed from the body structure.

35. The latch and hinge combination of claim 34 wherein the movable latch components include a notched rotary bolt that is rotatably connected to the housing for movement between said latched and unlatched positions, a rotary pawl that is rotatably connected to the housing for movement between a release position that does not obstruct rotation of the rotary bolt, and a retaining position wherein the rotary pawl engages and retains the rotary bolt in the latched position.

36. The latch and hinge combination of claim 35 wherein the latch assembly also includes biasing means for biasing the rotary bolt toward the unlatched position and for biasing the rotary pawl toward the retaining position.

37. The latch and hinge combination of claim 34 wherein the latch assembly has a release arm that is pivotally connected to the housing, and a manually engageable formation is provided for pivoting the release arm to effect movement of the movable latch components from the latched position to the unlatched position.

38. The latch and hinge combination of claim 37 wherein latch assembly includes a flexible cable that connects the manually engageable formation to the release arm thereby permitting the release arm to be operated from a distance equal to the distance that the flexible cable positions the manually engageable formation from the release arm.

39. The latch and hinge combination of claim 38 wherein the second arm defines means for engaging the flexible cable for positioning and guiding movements of the flexible cable.

40. The latch and hinge combination of claim 34 additionally including biasing means for biasing the first and second arms relative to each other to maintain engagement between the first arm and the cover when the latch assembly is disengaged from the latch striker.

41. The latch and hinge combination of claim 40 wherein the first and second arms are positioned side by side and are pivotally connected by a pin that extends along the pivot axis and has opposite end regions that extend through pin-receiving formations defined by each of the first and second arms, and wherein the biasing means includes a spring having coils that wrap about a central region of the pin and spring end formations that each engage a different one of the first and second arms.

42. The latch and hinge combination of claim 41 wherein at least one of the first and second arms has a stamped indentation configured to receive one of the spring end formations.

43. The latch and hinge combination of claim 34 wherein the first and second arms are positioned side by side and are pivotally connected by a pin that extends along the pivot axis and has opposite end regions that extend through pin-receiving formations defined by each of the first and second arms, wherein one of the end regions of the pin is rigidly connected to one of the first and second arms, and wherein a rotation range limiting connection is provided between the other of the end regions of the pin and the other of the first and second arms to limit the range of permitted relative rotation between the first and second arms about the pivot axis.

44. The latch and hinge combination of claim 43 wherein the rotation range limiting connection includes a stop formation carried by the pin that extends into a slot defined by the pin-receiving formation of the said other of the first and second arms, wherein engagement of the stop formation with opposite ends of the slot limits the permitted relative rotation between the first and second arms.

45. The latch and hinge combination of claim 34 wherein the latch striker includes:
   a) structure defining two spaced, overlying side walls interconnected by a transversely extending base wall that cooperates with the side walls to provide the structure with a generally U-shaped cross-section that extends about a latch-receiving chamber;
   b) a striker rod that extends transversely into the latch-receiving chamber from at least one of the side walls; and,
   c) means connected to at least one of the side walls for engaging the housing of the latch assembly when the latch assembly enters the latch-receiving chamber to enable the latch assembly to latchingly engage the striker rod.

46. The latch and hinge combination of claim 45 wherein the means connected to at least one of the side walls includes means connected each of the side walls for engaging opposite sides of the housing of the latch assembly to bias the housing of the latch assembly away from each of the side walls and toward the center of the latch-receiving chamber.

47. The latch and hinge combination of claim 45 additionally including an end cap removably connected to at least one of the side walls for limiting access to the latch-receiving chamber.

48. A hinge-mounted latch and striker system for establishing a pivotal connection between a cargo compartment cover and body structure defining a cargo compartment of a vehicle to permit the cover to pivot between an open position that provides access to the cargo compartment and a closed position closing at least a selected portion of the cargo compartment, and for permitting the cover to be removed from the structure, comprising:
   a) a hinge having a first arm for connection to a selected one of the cover and the body structure, and a second arm pivotally connected to the first arm;
   b) a striker for connection to the other of the cover and the body structure; and,
   c) a rotary latch assembly having a notched housing rigidly connected to the second arm, a notched jaw rotatably connected to the housing, first means for retaining the notched jaw in a latched position wherein the notched jaw is cooperative with the notched housing to maintain a latched connection between the rotary latch assembly and the striker that enables the cover to pivot relative to the body structure between the open position and the closed position, and second means for being operated manually to release the latched connection between the rotary latch assembly and the striker to permit the cover to be removed from the body structure.

49. The system of claim 48 wherein the striker has a striker housing of generally U-shaped cross-section that has a base wall that connects a pair of substantially parallel extending, spaced side walls that cooperate to extend about a central region configured to receive the housing of the rotary latch assembly when the cover is in the closed position, and a formation extending into the central region from at least one of the side walls for being latchingly engaged by the rotary latch assembly when the closure is in the closed position.

50. The system of claim 49 wherein the striker also has means connected to at least a selected one of the base wall and the spaced side walls for pressing resiliently against the housing of the rotary latch assembly when the housing of the rotary latch assembly is received in the central region.

51. The system of claim 50 wherein the means for pressing resiliently against the housing of the rotary latch assembly biases the rotary latch assembly to move out of the central region when the latching engagement between the rotary latch assembly and the striker is released.

52. The system of claim 50 wherein the means for pressing resiliently against the housing of the rotary latch assembly biases the housing of the rotary latch assembly away from at least a chosen one of the side walls of the striker housing.

53. The system of claim 48 wherein the hinge includes biasing means interposed between the first arm and the second arm to bias the second arm into engagement with the cover when the latched connection between the rotary latch assembly and the striker is released.

54. The system of claim 48 wherein the hinge includes means for limiting a permitted range of relative pivotal movement that can take place between the first arm and the second arm.

55. The system of claim 48 wherein the first arm and the second arm are pivotally connected by a pivot pin that is rigidly connected to a selected one of the first and second arms, and means for limiting relative rotation between the first and second arms is provided that includes interactive formations defined by the other of the arms and the pivot pin.

56. The system of claim 48 wherein the rotary latch assembly and the striker are adapted to permit the striker to be slammed into latching engagement with the rotary latch assembly.

57. The system of claim 56 wherein the rotary latch assembly is positioned such that the second means can only be accessed when the cover is in the open position for being operated to manually release the latched connection between the rotary latch assembly and the cover.

58. A latch system for releasably retaining in a closed position a cargo compartment cover of a vehicle that is movable between the closed position and an open position that provides access to a cargo compartment defined by body structure of a vehicle, comprising:
   a) first and second latch assemblies for being connected to the cover for latchingly engaging first and second latch strikers, respectively, connected to the body structure, and for being operated to release the cover so the cover can be moved to the open position;
   b) a latch operating assembly having a housing for mounting at a selected location on the cover, wherein the housing is elongate and defines first and second end regions, with the first end region being located closest to the first latch assembly, and with the second end region being located closest to the second latch assembly;
   c) with the housing having a generally curved cross-section defined at least in part by a generally concave rear wall that substantially conforms to a convex surface defined by the closure at the selected location;
   d) with the latch operating assembly also including first and second latch operators connected to the first and second end regions, respectively, for movement toward and away from each other;
   e) first means for connecting the first latch assembly to the first latch operator, and second means for connecting the second latch assembly to the second latch operator, such that, when the first and second latch operators are moved toward each other, the first and second latch assemblies are caused to substantially concurrently release the cover for movement to the open position; and,
   f) wherein the housing has-a curved front wall that cooperates with the curved rear wall to provide the housing with a generally C-shaped cross-section.

59. The latch system of claim 58 wherein the first and second end regions of the housing define first and second recesses that open through the curved front wall, and the first and second latch operators have first and second front portions located in and movable toward and away from each other in the first and second recesses, respectively, wherein the first and second front portions have curved first and second front surfaces, respectively, that substantially match the configuration of the curved front wall of the housing.

60. The latch system of claim 59 wherein the first and second latch operators define first and second undercut formations that extend rearwardly from the first and second front surfaces, respectively, to define first and second finger graspable formations that may be engaged and grasped by the fingers of one hand to move the first and second latch operators toward each other and to move the cover away from the closed position.

61. The latch system of claim 59 wherein the first and second recesses have first and second back walls, respectively, that substantially align, wherein first and second aligned slots are formed through the first and second back walls, respectively, and wherein the first and second latch operators have formations that extend through the first and second back walls, respectively, and wherein the first and second latch operators have first and second rear portions that connect with the first means and the second means, respectively.

62. The latch system of claim 61 wherein the housing has a central portion located between the first and second recesses, a key-operated lock cylinder is connected to the central portion for moving a locking formation located at the rear of the lock cylinder between an unlocked position wherein the locking formation does not interfere with movement of the first and second latch operators toward and away from each other, and a locked position wherein the locking formation prevents movement of the first and second latch operators toward each other by blocking paths of movement that are followed by the first and second rear portions of the first and second latch operators when the first and second latch operators move toward each other.

63. A latch system for releasably retaining in a closed position a cargo compartment cover of a vehicle that has one side region of the cover connected by hinges to body structure that defines a cargo compartment of a vehicle, with the cover being movable about a pivot axis defined by the hinges between the closed position and an open position, comprising:
   a) first and second latch assemblies for being connected to the cover at first and second locations, respectively, that are near an opposite side region of the cover for latching engaging latch strikers connected to the body structure;
   b) a latch operator assembly for being connected to the cover at a position located generally between the first and second locations, wherein the latch operator assembly includes an elongate housing that has substantially identical first and second end regions that are symmetrical about an imaginary, transversely extending center plane that intersects the housing between the first and second end regions, and wherein the first and second end regions define first and second recesses, respectively, that also are substantially identical and substantially symmetrical about the center plane;
   c) wherein the latch operator assembly also includes first and second latch operators slidably connected to the housing and having first and second front portions located within the first and second recesses, respectively, for being moved relative to the housing between non-operated positions located relatively far from each other and operated positions located relatively closer to each other, and having first and second rear portions located behind the first and second recesses, respectively, and being connected to the first and second front portions, respectively, by first and second central portions that extend through first and second slots, respectively, that are defined by the housing to extend through first and second back walls of the housing located at the rear of the first and second recesses, respectively;

d) first means for connecting the first rear portion to a first release of the first latch assembly for moving the first release to unlatch the first latch assembly from the first latch striker in response to movement of the first latch operator from the non-operated position of the first latch operator to the operated position of the first latch operator; and e) second means for connecting the second rear portion to a second release of the second latch assembly for moving the second release to unlatch the second latch assembly from the second latch striker in response to movement of the second latch operator from the non-operated position of the second latch operator to the operated position of the second latch operator.

64. The latch system of claim 63 additionally including means for biasing the first and second latch operators toward the non-operated positions.

65. The latch system of claim 64 wherein the means for biasing is connected to the first means and the second means so as to apply said biasing force to the first and second latch operators.

66. The latch system of claim 64 wherein a first locking member is connected to the first rear portion for movement with the first latch operator, a second locking member is connected to the second rear portion for movement with the second latch operator, and the means for biasing is interposed between the first and second locking members so as to apply said biasing force to the first and second latch operators.

67. The latch system of claim 63 additionally including means connected to the first and second latch operators for moving with the first and second latch operators for covering the first and second slots during such movement to minimize the passage of moisture through the first and second slots.

68. The latch system of claim 63 additionally including a key operated lock cylinder carried by the elongate housing at a central location between the first and second recesses, and means for being moved by the lock cylinder between an unlocked position that permits movement of the first and second latch operators between the non-operated and operated positions, and a locked position that blocks movement of the first and second latch operators to the operated positions.

69. A latch operator for independently and for concurrently operating a first latch assembly and a second latch assembly located at positions spaced from each other for releasing the first latch assembly from latchingly engaging a first latch striker, and for releasing a second latch assembly from latchingly engaging a second latch striker, comprising:

a) an elongate one-piece housing that has substantially identical first and second end regions located at opposite ends of a length of the housing, 1) wherein the first and second end regions are connected by a central region, 2) wherein the first and second end regions and the central region cooperate to define a front outer surface of the housing that extends along at least portions of the length of the housing, 3) wherein the first end region defines a first recess that opens forwardly through the front outer surface and has a first back wall that closes rear portions of the first recess, 4) wherein the second end region defines a second recess that opens forwardly through the front outer surface, that has a second back wall that closes rear portions of the second recess, and that is substantially identical to the first recess; 5) wherein the central region extends between and separates the first recess from the second recess, and 6) wherein the central region defines a substantially centrally located hole that opens forwardly through the front outer surface of the housing and that opens rearwardly through a back surface defined by the central region of the housing;

b) wherein the first back wall has a first slot formed therethrough that opens forwardly into the first recess and that has a length that substantially parallels the length of the housing, and wherein the second back wall has a second slot formed therethrough that opens forwardly into the second recess and that has a length that substantially parallels the length of the housing;

c) a first latch operator slidably connected to the housing and having a first front portion located within the first recess, wherein the first latch operator is movable within the first recess between a non-operated position of the first latch operator and an operated position of the first latch operator, with the first latch operator being located closer to the second recess when the first latch operator is in the operated position of the first latch operator than when the first latch operator is in the non-operated position of the first latch operator;

d) a second latch operator slidably connected to the housing and having a second front portion located within the second recess, wherein the second latch operator is movable within the second recess between a non-operated position of the second latch operator an operated position of the second latch operator, with the second latch operator being located closer to the first recess when the second latch operator is in the operated position of the second latch operator than when the second latch operator is in the non-operated position of the second latch operator;

e) wherein the first latch operator has a first rear portion located behind the first back wall of the first recess, and a first central portion that extends through the first slot to connect the first front portion and the first rear portion;

f) wherein the second latch operator has a second rear portion located behind the second back wall of the second recess, and a second central portion that extends through the second slot to connect the second front portion and the second rear portion;

g) wherein the first rear portion is adapted for connection to a release of a first latch for operating the release of the first latch in response to movement of the first latch operator from the non-operated position of the first latch operator to the operated position of the first latch operator;

h) wherein the second rear portion is adapted for connection to a release of a second latch for operating the release of the second latch in response to movement of the second latch operator from the non-operated position of the second latch operator to the operated position of the first latch operator;

i) wherein the first latch operator and the second latch operator are configured to permit independent movement of the first latch operator to release the first latch without causing movement of the second latch operator to release the second latch, to permit independent movement of the second latch operator to release the second latch without causing movement of the first latch operator to release the first latch, and to permit concurrent movement of the first and second latch operators to concurrently release the first and second latches;

j) a key operated lock cylinder mounted in the hole defined by the central region and having a cam located behind the back surface defined by the central region and adapted to be rotated between locked and unlocked position in response to rotation of an appropriately configured key inserted into the key cylinder; and, k) means 1) for being connected to the first rear portion of the first latch operator, 2) for being connected to the second rear portion of the second latch operator, and 3) for being engaged by the cam when the cam is in the unlocked position to prevent movement of the first latch operator to the operated position of the first latch operator, and to prevent movement of the second latch operator to the operated position of the second latch operator.

70. The latch operator of claim 69 wherein the elongate housing defines a rearwardly facing mounting surface that is curved concavely to facilitate mounting of the elongate housing on a closure surface that is curved convexly.

71. The latch operator of claim 69 additionally including means for biasing the first latch operator toward the non-operated position of the first latch operator, and for biasing the second latch operator toward the non-operated position of the second latch operator.

72. The latch operator of claim 70 wherein the means 1) for being connected to the first rear portion of the first latch operator, 2) for being connected to the second rear portion of the second latch operator, and 3) for being engaged by the cam includes a first locking member located behind the first recess and connected to the first latch operator for movement therewith, a second locking member located behind the second recess and connected to the second latch operator for movement therewith, and the first and second locking members are configured to be engaged by the cam of the key operated lock cylinder when the cam is in the locked position to prevent movement of the first and second latch operators away from the non-operated positions of the first and second latch operators, and to be disengaged by the cam of the key operated lock cylinder when the cam is in the unlocked position to permit movement of the first and second latch operators to the operated positions of the first and second latch operators.

73. The latch operator of claim 69 additionally including first means connected to the first latch operator and positioned adjacent the first slot for blocking moisture passage through the first slot, and second means connected to the second latch operator and positioned adjacent the second slot for blocking moisture passage through the second slot.

74. The latch operator of claim 72 additionally including biasing means for acting on the first locking member and on the second locking member for biasing the first latch operator toward the non-operated position of the first latch operator, and for biasing the second latch operator toward the non-operated position of the second latch operator.

75. A latch striker for being latchingly engaged by a rotary latch assembly and for protectively enclosing at least portions of the rotary latch assembly during such engagement, comprising:

a) a stamped metal housing having a bottom wall that joins spaced, substantially parallel-extending side walls to provide a U-shaped housing for surrounding a latch receiving chamber;

b) a post extending into the chamber from at least one of the side walls for being latchingly engaged by the rotary latch assembly when the rotary latch assembly is moved into the latch receiving chamber;

c) means extending from at least a selected one of the bottom wall and the side walls for pressing resiliently against the rotary latch assembly when the rotary latch assembly is moved into the latch receiving chamber; and, d) wherein the means for pressing resiliently against the rotary latch assembly includes a spring carrying member movably connected to the bottom wall for pressing against the rotary latch assembly to urge the rotary latch assembly out of the latch receiving chamber.

76. A latch striker for being latchingly engaged by a rotary latch assembly and for protectively enclosing at least portions of the rotary latch assembly during such engagement, comprising:

a) a stamped metal housing having a bottom wall that joins spaced, substantially parallel-extending side walls to provide a U-shaped housing for surrounding a latch receiving chamber;

b) a post extending into the chamber from at least one of the side walls for being latchingly engaged by the rotary latch assembly when the rotary latch assembly is moved into the latch receiving chamber;

c) means extending from at least a selected one of the bottom wall and the side walls for pressing resiliently against the rotary latch assembly when the rotary latch assembly is moved into the latch receiving chamber; and, d) wherein the means for pressing resiliently against the rotary latch assembly includes first and second spring members carried on opposite end regions of the post for biasing the rotary latch assembly away from each of the side walls toward a centered position within the latch receiving chamber.

77. The latch striker of claim 76 additionally including a first washer carried on the post adjacent the first spring, a second washer carried on the post adjacent the second spring, and a bushing carried at a central location on the post and having opposite ends that are engaged by the first and second washers.

78. The latch striker of claim 75 wherein the housing also has at least one end wall conected to at least a selected one of the bottom wall and the side walls that is configured to close at least a portion of a selected one of the ends of latch receiving chamber.

79. The latch striker of claim 76 wherein the housing also has at least one end wall connected to at least a selected one of the bottom wall and the side walls that is configured to close at least a portion of a selected one of the ends of latch receiving chamber.

80. The latch striker of claim 77 wherein the housing also has at least one end wall connected to at least a selected one of the bottom wall and the side walls that is configured to close at least a portion of a selected one of the ends of latch receiving chamber.

* * * * *